(12) United States Patent
van Coppenolle et al.

(10) Patent No.: US 9,338,502 B2
(45) Date of Patent: *May 10, 2016

(54) METHOD AND SYSTEM FOR COLLABORATIVE RECORDING AND COMPRESSION

(71) Applicants: Bart P. E. van Coppenolle, Leuven (BE); Philip W. J. Vandormael, Leuven (BE)

(72) Inventors: Bart P. E. van Coppenolle, Leuven (BE); Philip W. J. Vandormael, Leuven (BE)

(73) Assignees: Bart P. E. van Coppenolle, Leuven (BE); Philip W. J. Vandormael, Leuven (BE)

(*) Notice: Subject to any disclaimer, the term of this patent is extended or adjusted under 35 U.S.C. 154(b) by 0 days.

This patent is subject to a terminal disclaimer.

(21) Appl. No.: 14/572,235

(22) Filed: Dec. 16, 2014

(65) Prior Publication Data

US 2015/0172601 A1   Jun. 18, 2015

Related U.S. Application Data

(60) Provisional application No. 61/916,454, filed on Dec. 16, 2013, provisional application No. 61/926,591, filed on Jan. 13, 2014, provisional application No. 61/929,696, filed on Jan. 21, 2014, provisional application No. 61/968,645, filed on Mar. 21, 2014, provisional application No. 61/933,917, filed on Jan. 31, 2014, provisional application No. 61/934,915, filed on Feb. 3, 2014, provisional application No. 61/935,582, filed on Feb. 4, 2014, provisional application No. 61/938,723, filed on Feb. 12, 2014, provisional application No. 61/939,870, filed on Feb. 14, 2014, provisional application No. 61/948,714, filed on Mar. 6, 2014, provisional application No. 61/932,423, filed on Jan. 28, 2014.

(51) Int. Cl.
*H04N 7/167* (2011.01)
*H04N 21/433* (2011.01)
*H04N 21/4627* (2011.01)
*H04N 21/4788* (2011.01)
*H04N 21/63* (2011.01)

(52) U.S. Cl.
CPC ....... *H04N 21/4334* (2013.01); *H04N 21/4627* (2013.01); *H04N 21/4788* (2013.01); *H04N 21/632* (2013.01)

(58) Field of Classification Search
CPC ....... H04H 20/14; H04H 60/37; H04H 60/33; H04N 21/812; H04N 21/4784; H04N 7/163; H04N 21/4532; H04N 7/1675
USPC .................. 725/22–25, 31; 380/262, 264, 44; 709/205, 206
See application file for complete search history.

(56) References Cited

U.S. PATENT DOCUMENTS

| | | | | |
|---|---|---|---|---|
| 7,421,082 B2* | 9/2008 | Kamiya et al. | ................. | 380/278 |
| 8,234,217 B2* | 7/2012 | Derrenberger | ................... | 705/51 |
| 2002/0095604 A1* | 7/2002 | Hausler | ......................... | 713/201 |
| 2002/0159598 A1* | 10/2002 | Rubinstein et al. | ........... | 380/259 |
| 2008/0282312 A1* | 11/2008 | Blinnikka | ...................... | 725/153 |

\* cited by examiner

*Primary Examiner* — Oleg Asanbayev
(74) *Attorney, Agent, or Firm* — Burns & Levinson LLP; Bruce D. Jobse

(57) ABSTRACT

A data compression reduces redundancy over time using information from other frames and among different viewers. A personal compressed copy of content includes an array of keys, and encrypted copy of the content and a codebook. The codebook, which is not a copy of the content may be stored in shared memory.

5 Claims, 16 Drawing Sheets

METHOD AND SYSTEM FOR COLLABORATIVE RECORDING AND COMPRESSION

FIELD OF THE INVENTION

The disclosure relates to a method and apparatus for collaborative upload and receipt of content to enable time shifted viewing thereof and, more specifically, to network devices, such as Set-Top Boxes (STB) and Digital Video Recorders (DVR), configured for use in a collaborative manner.

BACKGROUND OF THE INVENTION

Consumers who can legally validly access a public performance of broadcast video content are allowed to make copies of that content for their own time shifted private viewing. A Personal Video Recorder (PVR) is a system that may comprise hardware and software, in such case called a Digital Video Recorder (DVR), which enables its user to technically execute this time shifting right. This copyright exception allowing legally validly receivable broadcast content to be copied for own private performance has become a basic principle of copyright law that has been adopted internationally, in technology neutral law and legislation, forming the legal basis for PVR, DVR and recently also cloud DVR systems.

Under certain interpretations of international copyright and broadcast law a personal copy of broadcast content should be stored in separate memory space in order to uniquely identify the copy as personal. Storing uncompressed personal video copies for a big number of viewers requires a lot of storage space. Therefore, an efficient compression technique is required in CVRs.

Different generations of the most popular video codecs according to increasing compression ratio: 1) Motion JPEG: storage of all frames, look for redundancy within 1 frame; 2) MPEG2 video: looking for redundancy over time, in relation to the previous frame; and 3) H264 video: looking for redundancy over time, in relation to maximum 21 previous or next frames or part of frames. However, using only the existing compression algorithms, still poses the problem of massive storage capacity for storing the same TV program for multiple viewers in the cloud, in CVRs.

Accordingly, a need exists for a system and technique for more efficient compression of video data for use with a Collaborative Video Recorder.

SUMMARY OF THE INVENTION

The disclosed compression technique not only compresses video over time using information from other frames, as with MPEG2 and H264 video compression/decompression (codec) protocols, but also compresses over the different viewers. Such viewers have been authenticated as entitled to receive the broadcast content and have expressed their will, or have produced volition, to make their personal copy for time-shifting purposes, and, therefore, are rightfully entitled to record these same programs. This solution drastically reduces the amount of storage capacity required to such order of magnitude suited for use in cloud DVRs.

According to one aspect of the disclosure, a viewer who has a valid content, e.g. TV, subscription makes a copy for time-shifted personal viewing, expressing his volition by using any of software, website and hardware (e.g. by pushing the buttons on the remote control). A copy is made using the CVR consisting of hardware and software, without direct interference of another person or third party.

The viewer expresses his volition by giving a record instruction using the bhaalu website and from time to time by using the red and blue buttons on the bhaalu remote control (RC) or equivalent functions on his smartphone, tablet or computer. After the user has expressed his volition to record, the software checks if the user has the valid right to view the broadcast content and therefore also to record the broadcast content for time-shifting purposes. Different authentication technologies can be used to check that right e.g. e-invoicing or an API call to the operator based on the consumer identification (or customer number) or an operator authentication website portal.

In summary, the CVR checks the identity of the user, the right of the user and the volition of the user and stores these checks as constituent key parts of the highly encrypted personal copy, when the user makes a copy using the CVR.

The personal copy consists of an array in function of time and broadcast channel, defining the recorded program and representing it in a highly encrypted form. A unique position in this array consists of a combination of the three personal key elements complemented with a time vector (such as the init vector specified in HLS) and an encryption code. The fourth key part of the personal copy is the encryption key, (such as an AES encryption key) which is unique per TV channel per time unit (typically a day). The fifth key element contained by the personal copy is the time vector determining the video segment within the day. By incorporating time in the personal copy, user volition to record cannot apply on the period prior to the expression by the unique user of his personal volition to record a video segment of broadcast content uniquely identified in time.

In summary, a personal broadcast program recording may comprise an array, each element being a mathematical combination of the five key elements: identity, right, volition, channel encryption and time. These five constituent elements together determine uniquely the broadcast content, the recording person and his/her right and volition at broadcast time, and allow after decryption the legal, time shifted consumption of the broadcast content, therefore materially constituting the user's personal copy in a highly compressed format.

In order to decode this highly compressed, encrypted personal copy stored in separated memory space per user, a codebook is used as the final decoding code array. The codebook may comprise a compressed and encrypted H264 video format, which does itself not uniquely describes the recording and is therefore not a copy of the broadcast content but is a decoding codebook. Only this codebook is stored in shared memory space of the collaborative video recorder.

When a viewer, after having recorded his/her personal copy, through his separate volition to playback, gives the instruction to playback his personal video recording using his/her remote control, smartphone, tablet or PC, his/her personal copy is decrypted using its key set and the codebook. Subsequently, his/her personal copy is streamed to his viewing device through unicast, guaranteeing private performance of his personal copy, since the peer to peer connection is made between the user separately storing his/her personal copy in separated private personal memory space and the same user himself/herself, without any direct interference from any other party. The unicast is thus streamed as a private performance from his/her personal copy in the cloud.

Play back of content is done by unicast streaming one's own personal copy to a device that has been registered to the authenticated user/viewer who made the copy and produced through such device volition to play back his or her own personal copy, ascertaining play back causation by the same particular person who produced recording volition.

The reception and copy making process is individual, given individual right to attend the public performance of broadcast content, the individual software license and hardware access and individual volition and causation, notwithstanding the collaborative sharing of hardware in the data center or cloud infrastructure. Causation is proven by the absence of the personal copy in case the particular person did not produce volition to record and the absence of any reception or copy in the cloud DVR, if none of its users produced volition to receive and record. All unicasts are clearly identifiable as separate streams between the authenticated copy making person's personal separate memory space and that same authenticated person's registered devices, guaranteeing private performance and excluding any public performance.

A cloud DVR system, i.e. a PVR including hardware and software partly located in the cloud, is voluntarily and causally used by the user who controls it. There is no retransmission, if the person who receives the broadcast does not retransmit or redistributes the content to any other person. The person voluntarily and causally controlling the cloud DVR makes the copy. And streaming one's own personal copy to one's self with a secured unicast does not constitute a making available to another person or the public.

According to one aspect of the disclosure, a method comprises: A)

providing a collaborative cloud storage system comprising: i) a cloud storage server comprising a network interface process for receiving into an associated network accessible memory data associated with a plurality of content objects, and ii) a plurality of viewer device processes operably coupled over a network to the cloud storage server and the network accessible memory, each of the plurality of viewer device processes having access to at least one channel of content objects; B) deriving a key array from user-defined indicia from one of the viewer device process and storing the key array and an encrypted personal copy of content object in a private memory associated uniquely with the viewer device process for storing, and C) generating a codebook useful in decrypting personal copy of the content object of the viewer device process and storing in a shared memory space. In one embodiment, the method further comprises D) upon receipt of indicia of volition from the viewer device process, utilizing the codebook to decrypt the personal copy of the content object and E) unicast transmitting the encrypted personal copy of the content object to only the viewer device process.

According to another aspect of the disclosure, a system comprises: A) a cloud storage server comprising a network interface for receiving into an associated network accessible memory data associated with a plurality of content objects; B) a plurality of viewer device processes operably coupled over a network to the cloud storage server and the network accessible memory, each of the plurality of viewer device processes having access to at least one channel of content objects; C) a private memory associated uniquely with each of the plurality of viewer device processes for storing is a key array derived from user-defined indicia from the viewer device process and an encrypted personal copy of a content object, and D) a shared memory space for storing a codebook useful in decrypting personal copy of the content object of one of the plurality of viewer device processes.

According to another aspect of the disclosure, a memory device system for use with a data processing system comprises: a first private memory portion associated uniquely with a viewer device processes for storing is a key array derived from user-defined indicia from the viewer device process and an encrypted personal copy of a content object, a second shared memory portion for storing a codebook useful in decrypting personal copy of the content object in the first private memory portion, wherein the first private memory portion and the second shared memory portion are interoperably accessible over a network.

DESCRIPTION THE DRAWINGS

The present disclosure is illustratively shown and described in reference to the accompanying drawings in which.

Figure 6A:
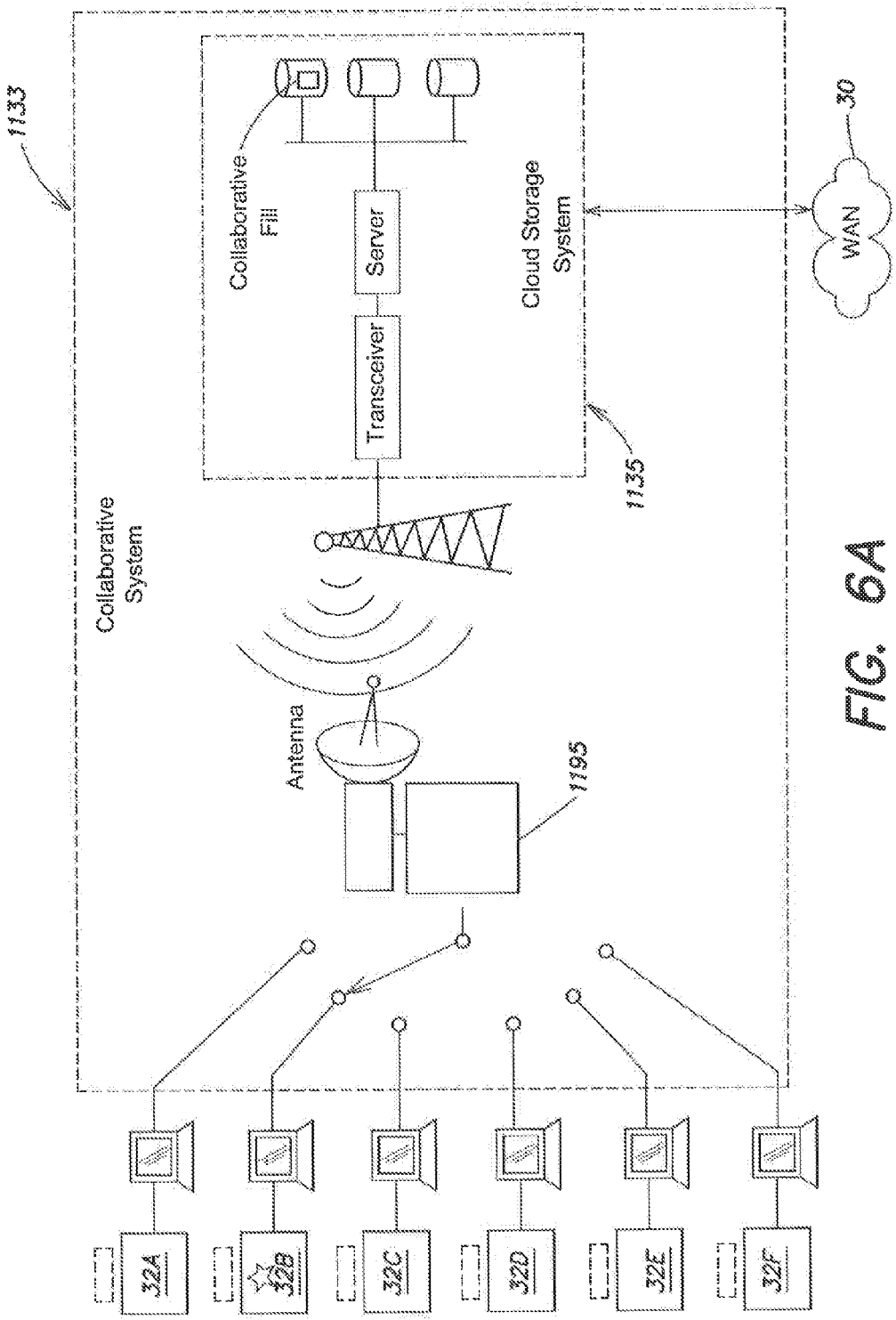
Figure 6B:
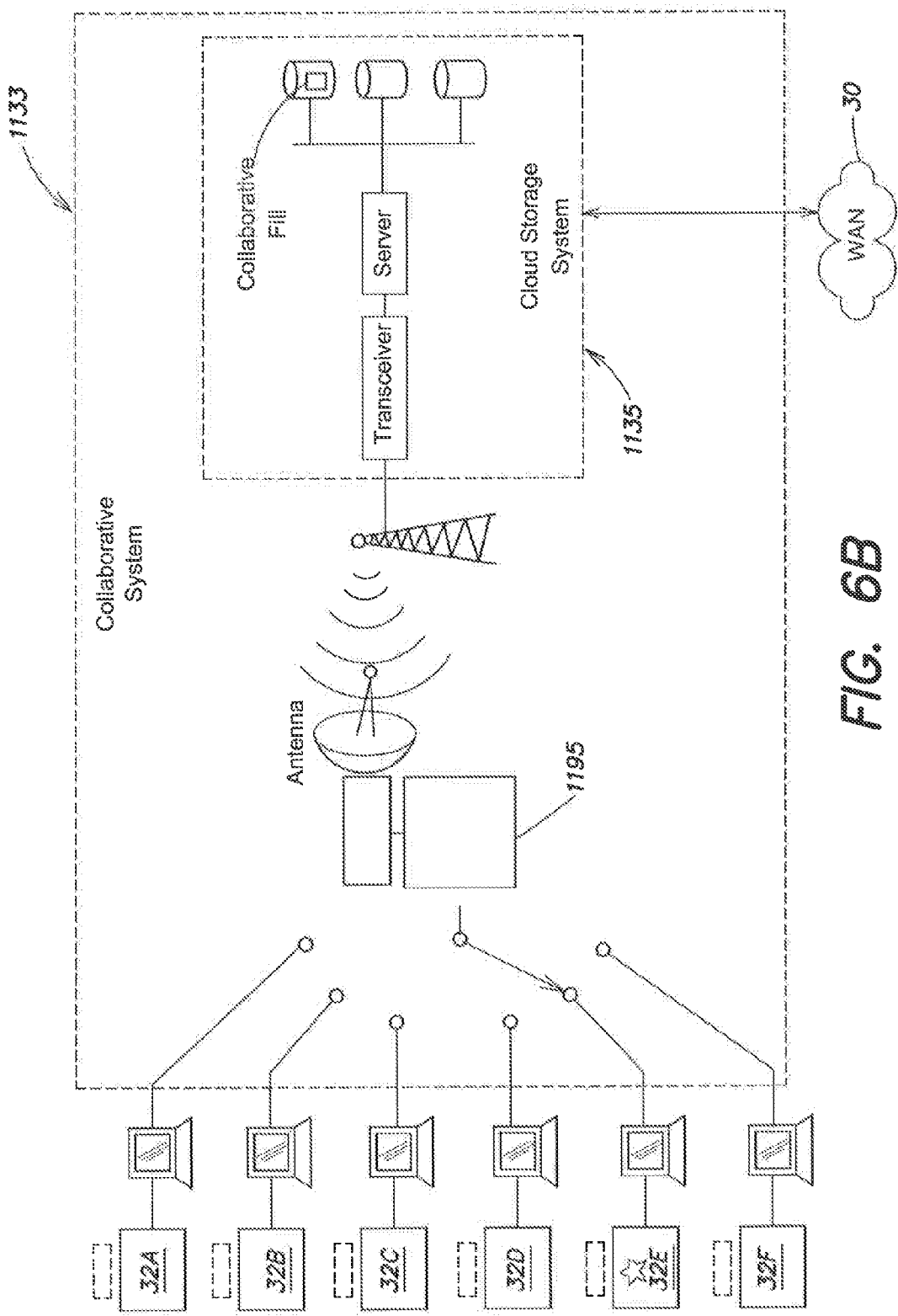
Figure 7A:
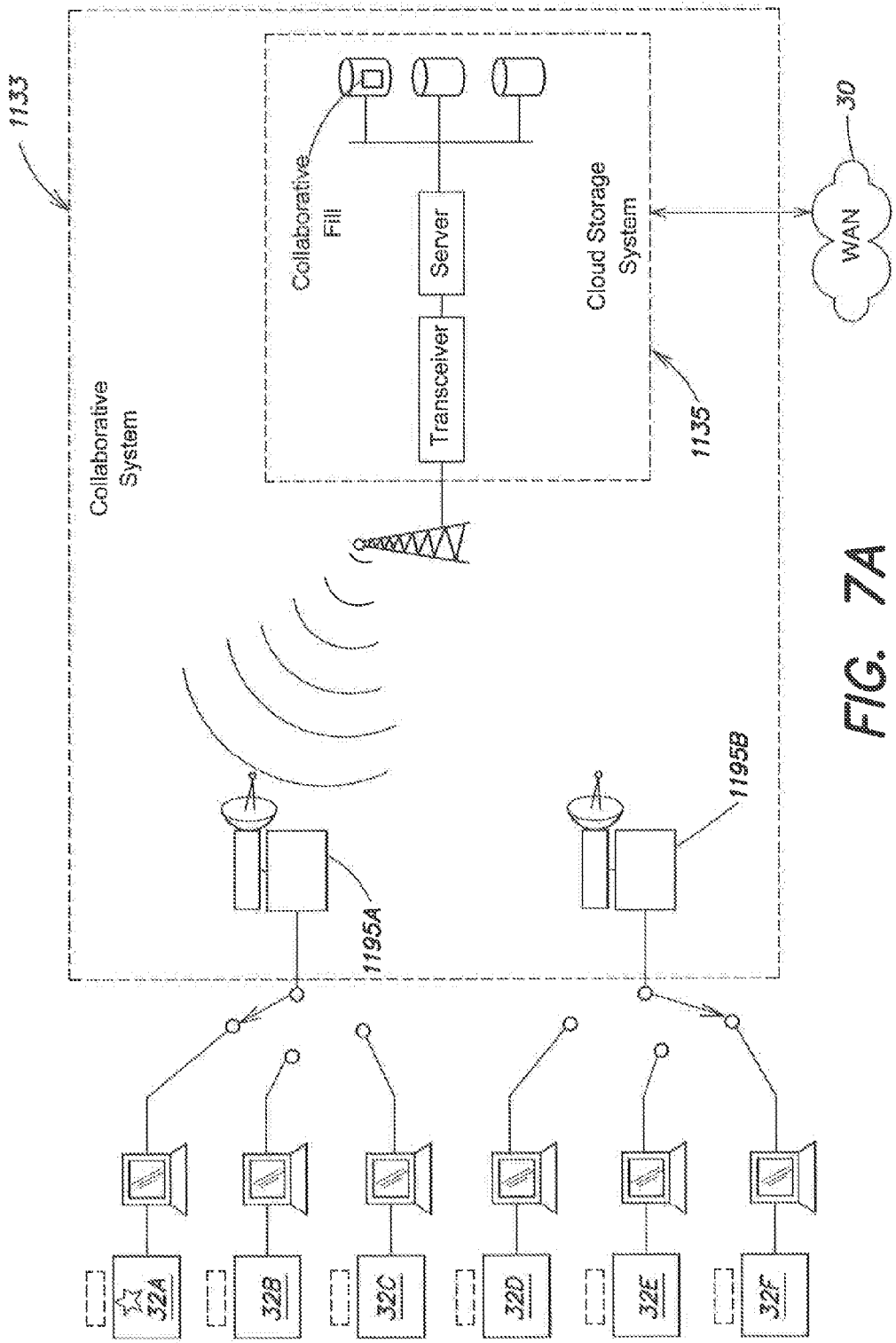
Figure 7B:
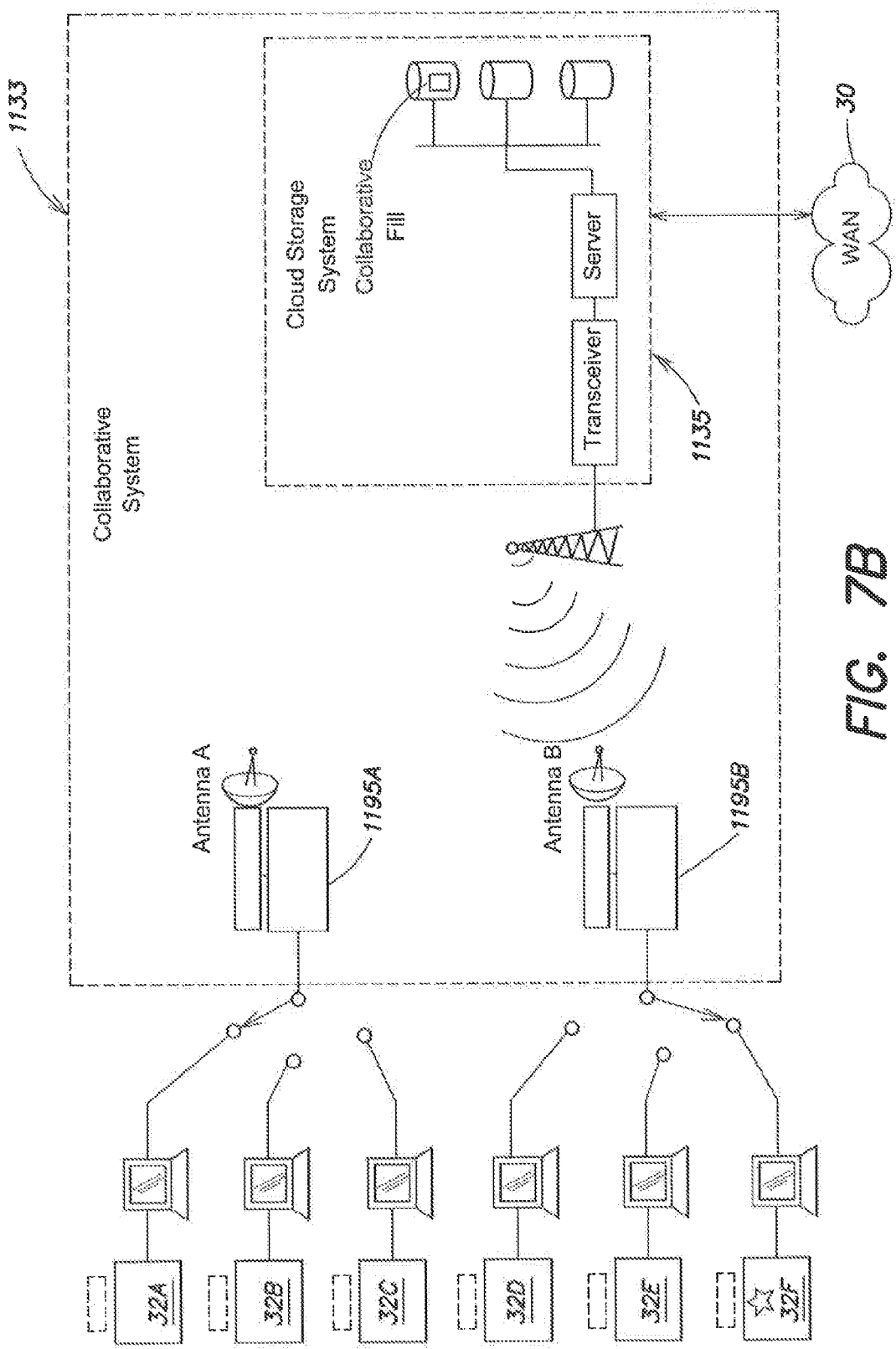
Figure 8:
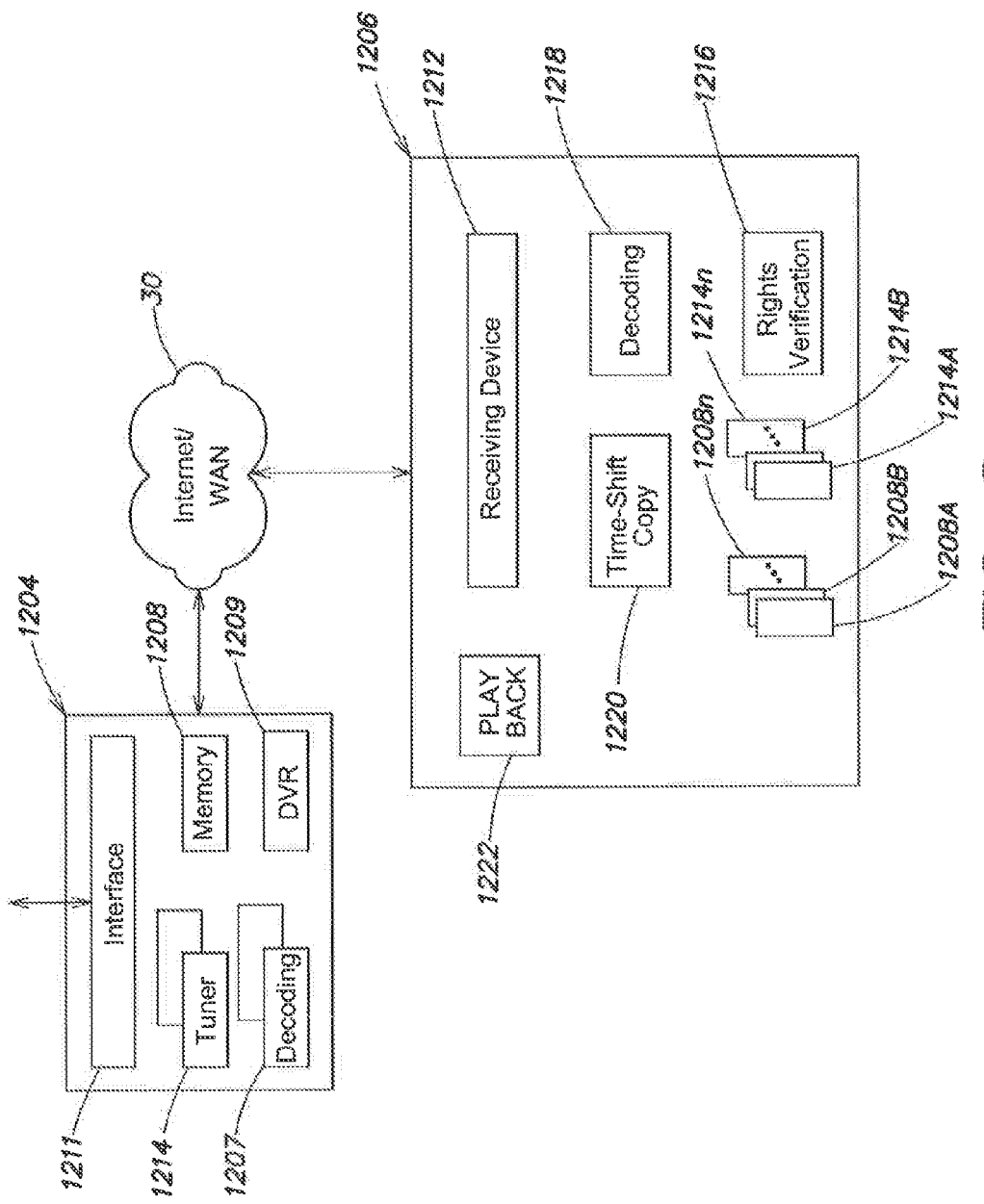
Figure 9:
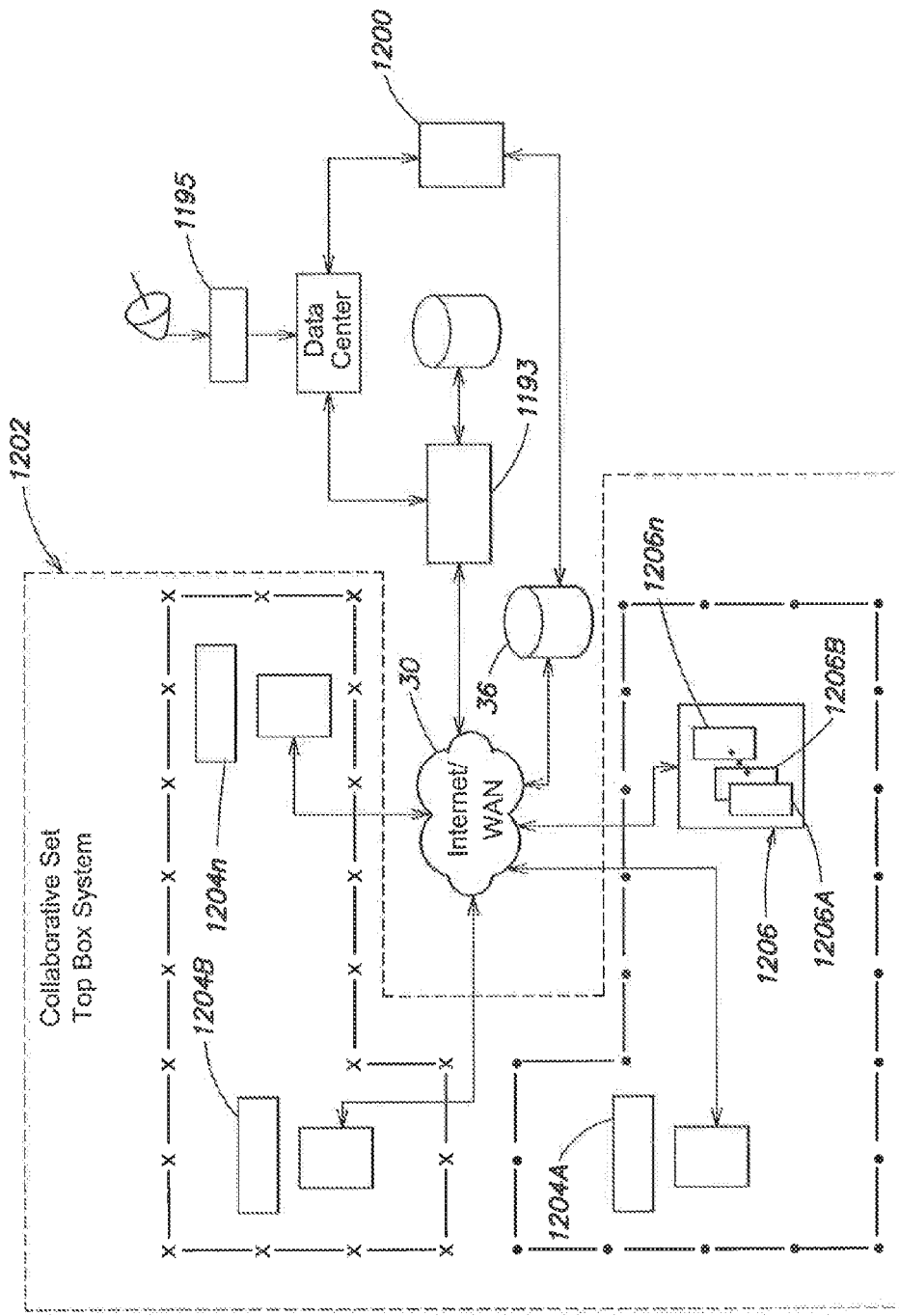
Figure 10:
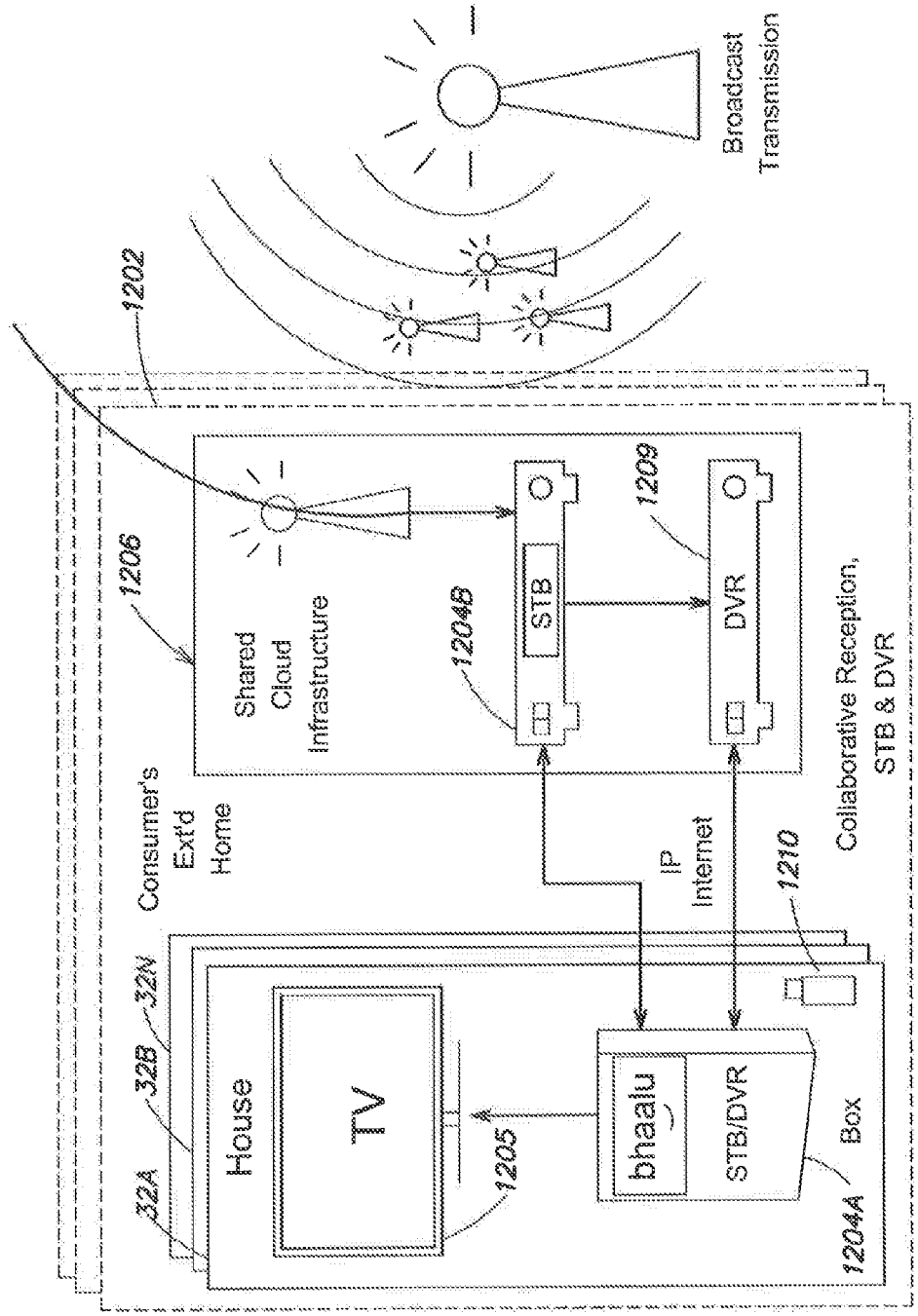
Figure 11:
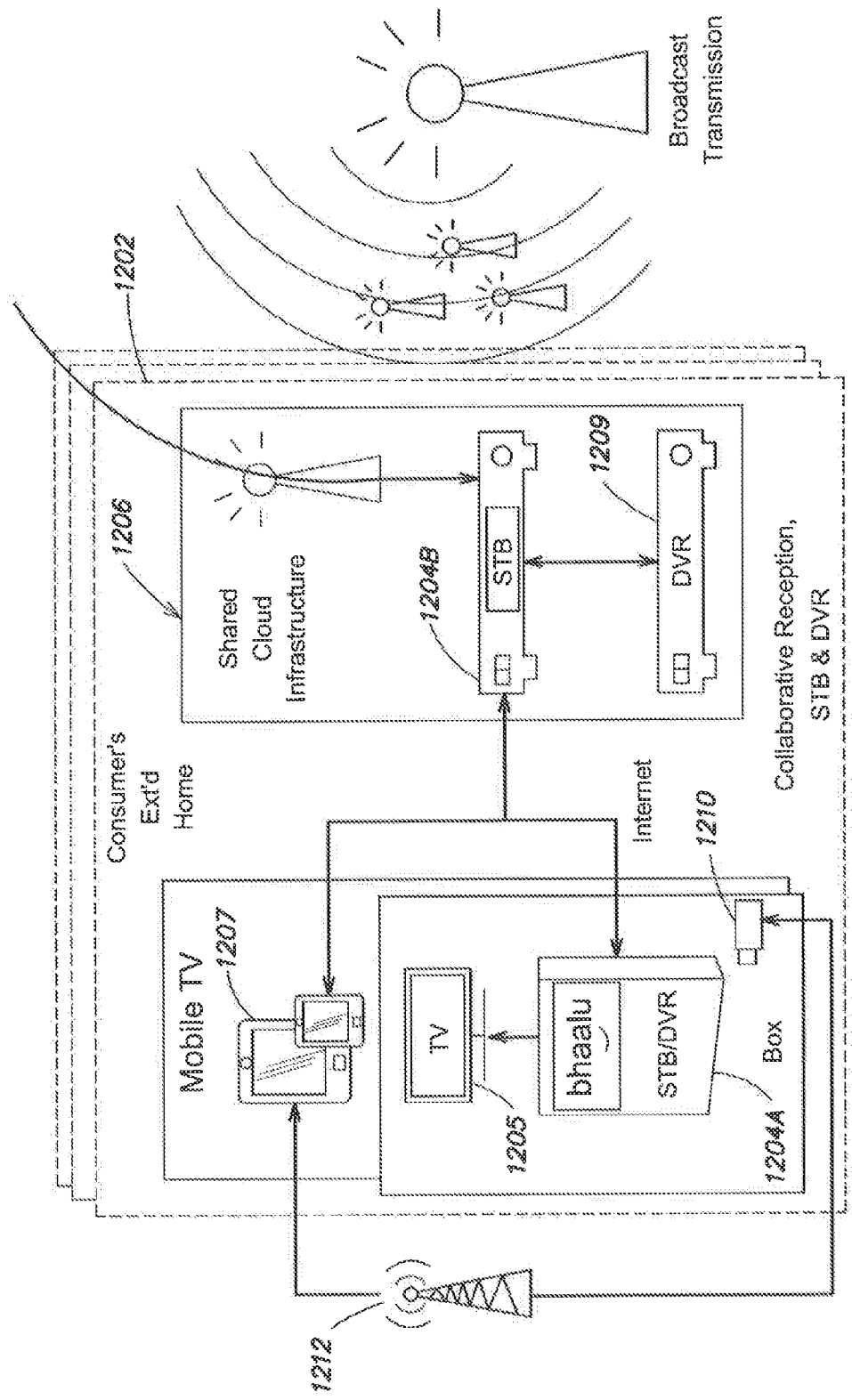
Figure 12:
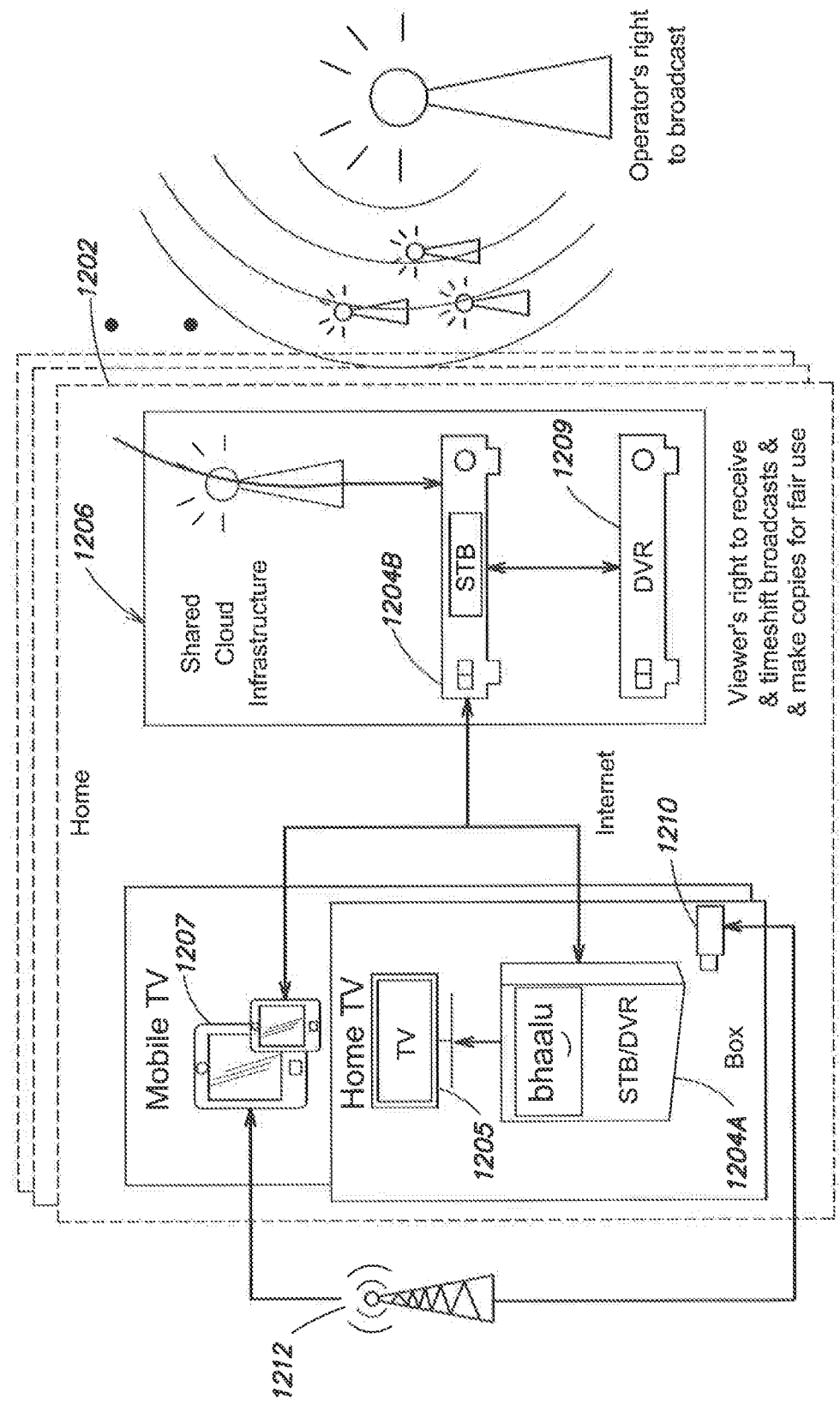
Figure 13:
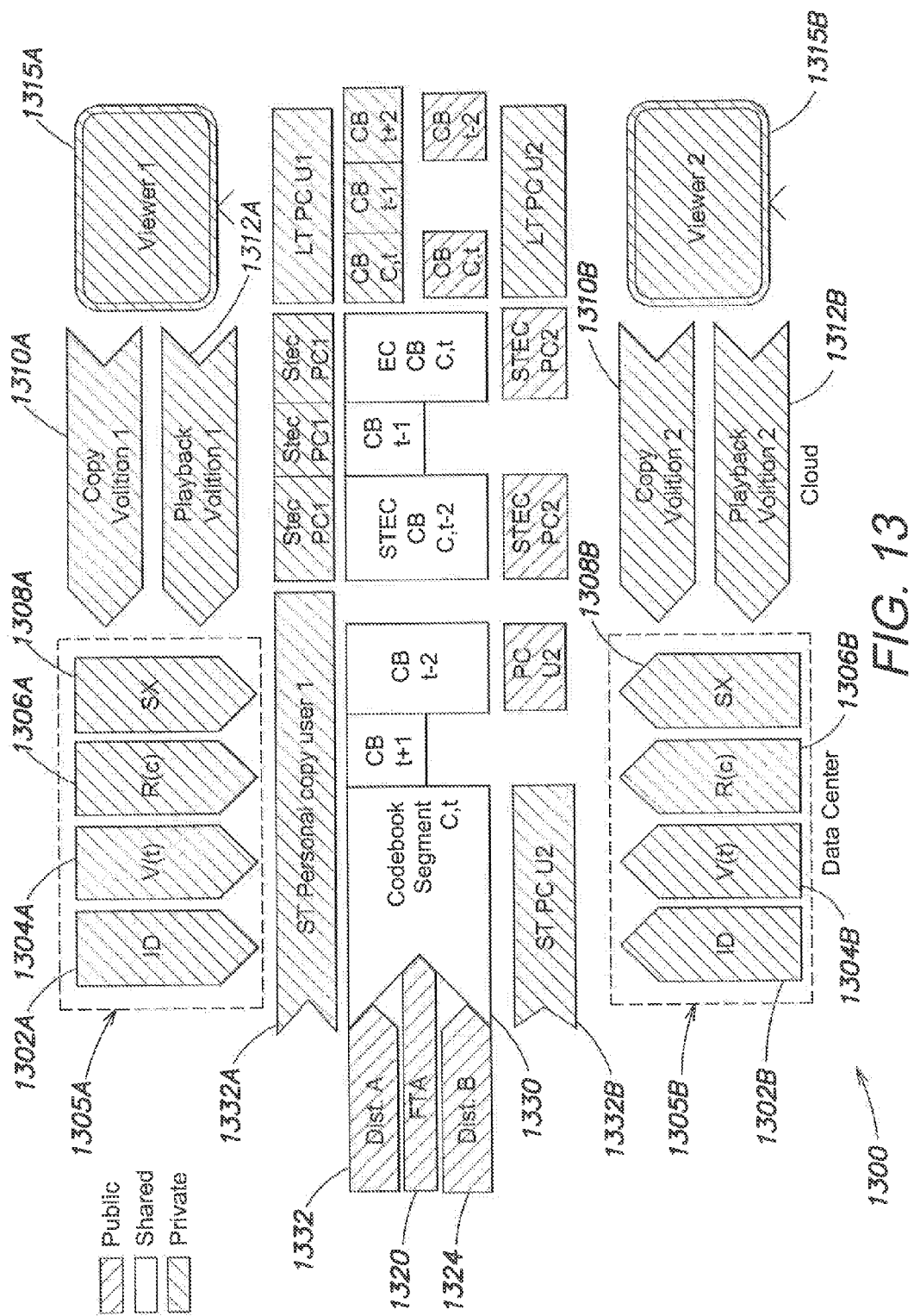

FIG. 6A-B illustrate conceptually a collaborative shared antenna may be implemented in accordance with the disclosure;

FIG. 7A-B illustrate conceptually a collaborative shared antenna may be implemented in accordance with the disclosure;

FIG. 8 illustrates conceptually a collaborative set-top box system in accordance with the disclosure;

FIG. 9 illustrates conceptually a network environment in which the collaborative set-top box system of FIG. 8 may be implemented in accordance with the disclosure;

FIGS. 10-12 illustrate conceptually a network environment in which a collaborative set-top box system may be implemented in accordance with the disclosure; and FIG. 13 illustrates conceptually a diagrammatic representation of the relationship of the various components of the compression protocol in accordance with the disclosure.

DETAILED DESCRIPTION

Collaborative Cloud Digital Video Recorder System Architecture

Figure 1:
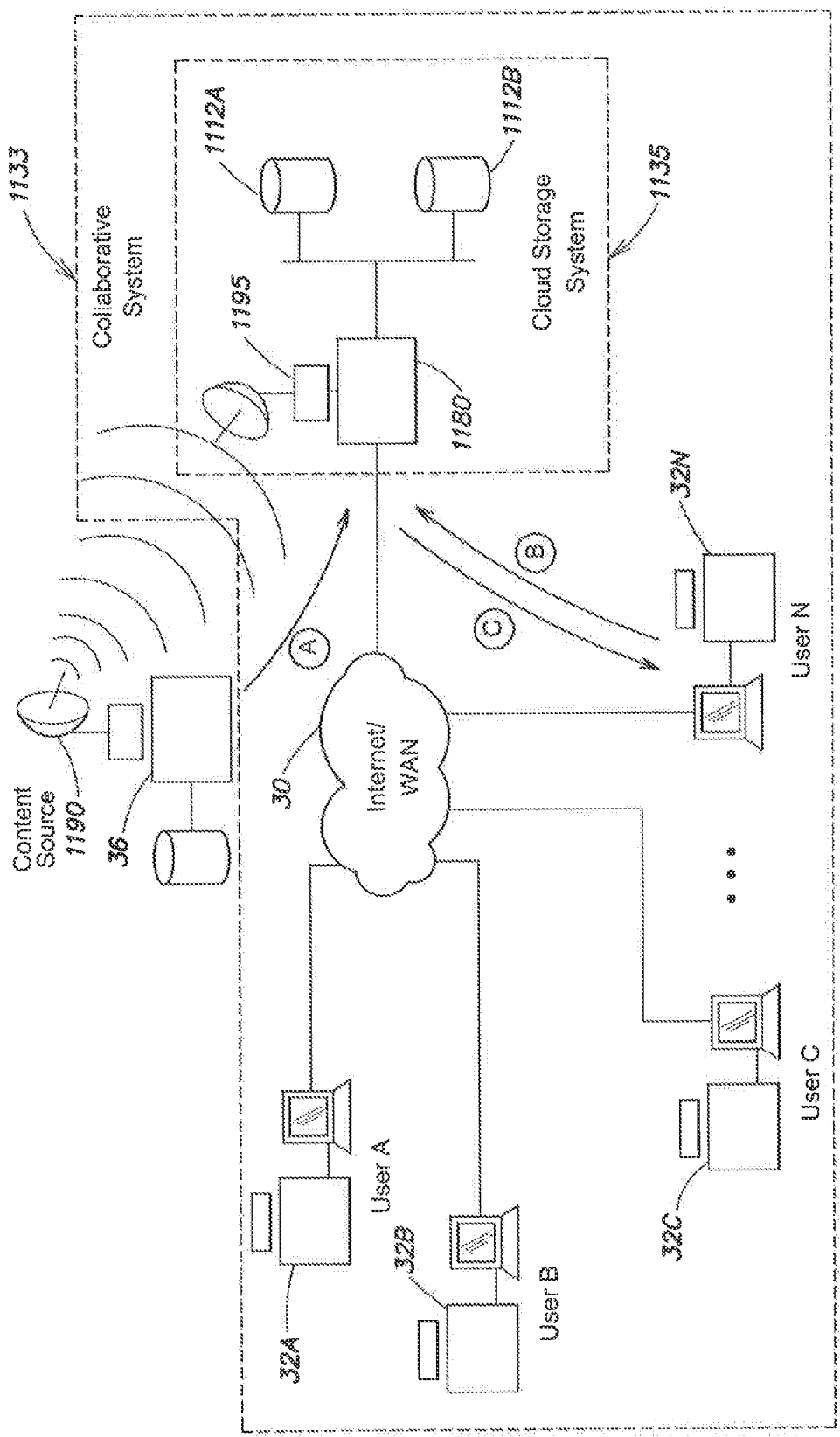
FIG. 1 illustrates conceptually a network environment in which a collaborative shared antenna or receiving apparatus may be implemented in accordance with the disclosure.

FIG. 1 illustrates conceptually a network environment in which a collaborative shared antenna 1190 may be used with a collaborative cloud DVR (ccDVR) system 1133. The ccDVR system 1133 comprises at least one cloud storage system 1135 and a plurality of viewer interface systems 32*a-n*. Cloud storage system 1135 may be implemented with any number of network storage technologies including those described herein. In the illustrative embodiment, cloud storage system 1135 may comprise a plurality of mass storage devices 1112A-C accessible by a server 1180 executing one or more control programs 1185. One such cloud based computing and storage infrastructure service useful with the disclosed system is Amazon 53, commercially available from Amazon.com, Seattle, Wash., Cloud storage system 1135 may be implemented with mass storage devices such as the EMC Atmos, line of products commercially available from EMC Corporation, Hopkinton, Mass.

Disclosed herein is a system and technique in which an antenna or cable system component, or other receiving mechanism, cooperatively shared among a community of users, receives a broadcast signal. After a viewer/user gives a record instruction, a process associated with the shared receiver, antenna or cable, immediately makes a collaborative, implied or explicitly licensed, copy of the broadcasted content for storage in a cloud storage system. Upon request of a specific user in the community, the content is streamed in a unicast manner over the Internet or other network technology to the particular community member requesting the unicast, only when such user has the implied or explicit right to view the streamed content in a time-shifted manner and has made a copy for that purpose.

As a solution to the technical problems of the prior art, an antenna 1190 (or cable infrastructure if the cable is shared instead of an antenna) is shared among a community of viewers 32a-n with the same implied or explicit viewing or copying rights. Since all members of the community are implicitly or explicitly allowed to make a copy for their own private viewing in a time shifted manner, the community members can collaboratively make a copy together, provided that each community member contributing to the collaboration effectively has the implied or explicit right to make a copy and gives the copy instruction. Instead of each community user storing their copy locally in their respective viewer system 32 or uploading to cloud storage 1135, a collaborative copy 1185 is made using an antenna 1195, to which all members of the collaborative community have access rights since it is their private copy, and is stored in cloud storage system 1135, as indicated by arrow A in FIG. 1. Similarly, instead of receipt of the content file from antenna 1190, in FIG. 2, the content is received from a portion of the cable network infrastructure to a receiving mechanism, again, to which all members of the collaborative community have access rights, and then stored in cloud storage system 1135, as indicated by arrow A in FIG. 2. In the disclosed system, a user DVR box still receives the instruction to make a copy from the community member and transmit such instruction to the cloud storage system 1135. In this manner, the need to actually receive the broadcasted signal or the original content stream as well as to stream the received content from the community user's DVR box to a remote storage facility are eliminated, thereby saving bandwidth and providing a solution to the problem of not technically being able to time-shift or at least have a relaxing time-shifting experience.

Figure 2:
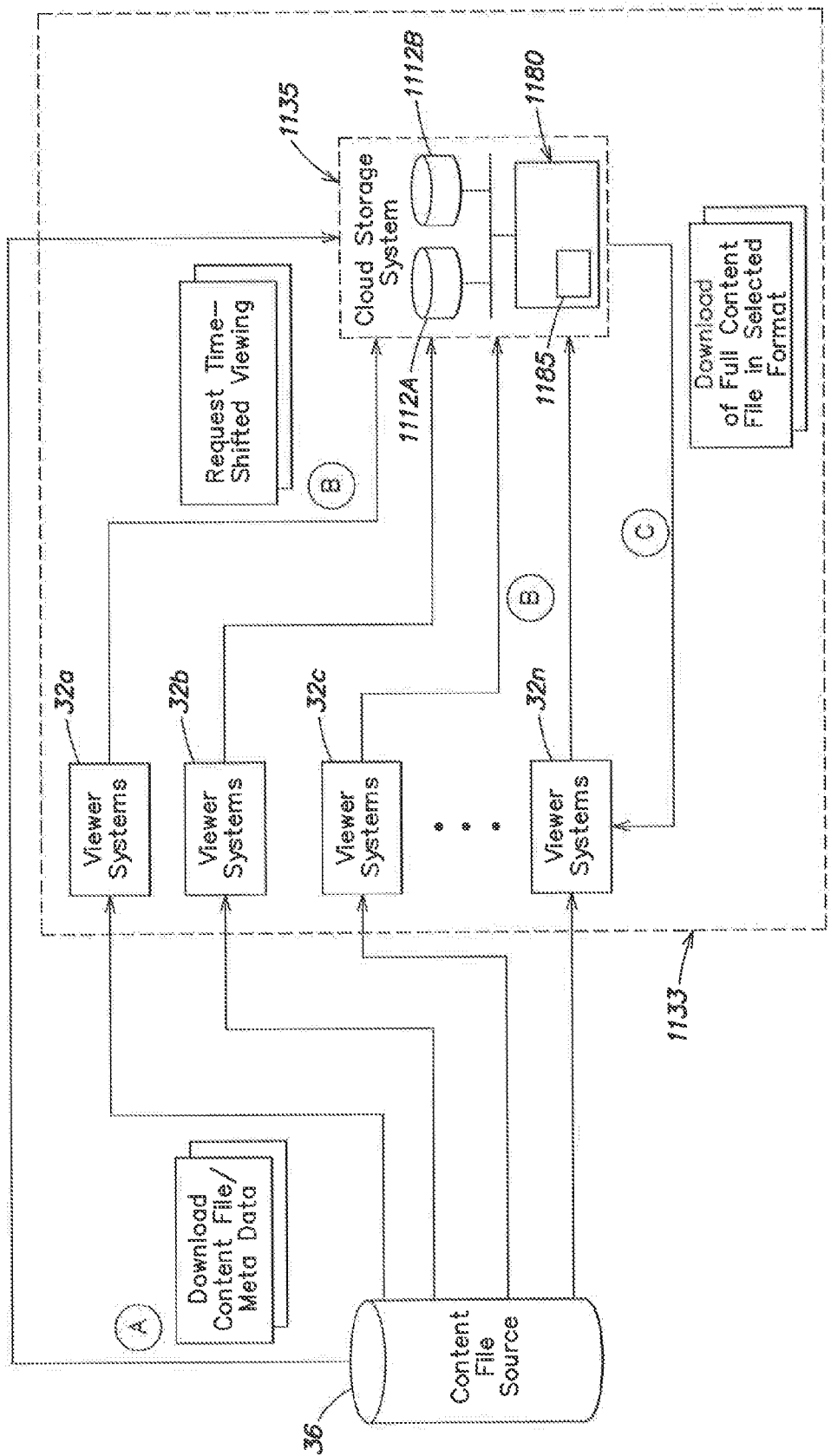
FIG. 2 illustrates conceptually a network environment in which a collaborative upload/download technique may be implemented in accordance with the disclosure.

At a time following receipt of a content file into cloud storage system 1135, a user DVR box receives the instruction to download or stream his copy from the community member and transmit such instruction to the cloud storage system 1135, as also illustrated by arrow B in FIGS. 1-2. The cloud storage system 1135 authenticates the request from the viewer system and, if allowable, the content is streamed in a unicast manner over internet or other network technology to the particular community member requesting the unicast. Note in the disclosed system, the requesting viewer may be authenticated to have either implied or explicit rights to view the streamed content in a time-shifted manner or make a copy for that purpose.

FIG. 2 illustrates conceptually the collaborative cloud DVR system 1133 in which the antenna 1190 of FIG. 1 has been replaced with a generic content file source 36 which may be any portion of a cable network. In the illustrative embodiment, referring to FIG. 2-3B, cloud storage system 1135, comprises a server 1180 and accompanying database(s) 1112A-C and network streaming interface 1185. The data contained within a data structure received from process 1102 of any of viewer systems 32 is utilized by server 1180 to store a complete copy of the content object for retention within one of databases 1112A-C. For example, process in interface 1185 within server 1180 may utilize temporal or sequential identifiers or markers, or other mechanisms associated with the content and arranges the received portion of the content according to its relationship to other portions previously received. In this manner, a complete copy of the content object (program) is assembled from any of viewer systems 32a-n and retained by system 1135 for later viewing upon request by a viewer who is authorized to view such content object. Specifically, when a viewer requests a content object, server 1180 determines if the identified content object is stored in databases 1112A-C. If so, the streaming interface 1185 will verify that the requesting viewer is authorized to view such content, and, upon confirmation thereof, begins streaming the content to the requesting viewer system 32, as illustrated by arrow C in FIG. 2. Server 1180 maintains within databases 1112A-C records for each viewer system 32a-n indicating which content objects within databases 1112A-C the viewer is authorized to download, such records being continually updated via processes 1102 and 1104 of each of the viewer systems 32a-n as illustrated in FIG. 3B. In this manner it is known whether, each of the viewer systems 32a-n is authorized to a view specific content object.

In the illustrative environment, the authorization indicia utilized by cloud storage system 1135 may take any number of different forms including one or more binary values arranged in a mask, special codes, keys, hash values, etc. In addition, such authorization indicia may be generated by the content source 36 or may be derived from the streamed content by process 1102. In an embodiment in which the content object from content source 36 is provided in an encrypted form, decryption keys or codes may be similarly provided to cloud storage system 1135 by process 1102 as part of the authorization indicia.

DVR device software in conjunction with cloud storage system verifies that viewer has authority to record content objects. In one embodiment, depending on the nature of the authorization protocol utilized with the ccDVR system 1133 and cloud storage system, the viewer/user may download and view a content object, e.g. a program series, in a time shifted manner, if licensed and actively uploaded from the viewer's DVR device, or if licensable. In this matter, the user only views his own copies made by the ccDVR system under his personal instruction.

In one embodiment, the viewer can only skip unwanted commercials if replacing them with other possibly, but not necessarily, personalized, commercials originating from the same broadcaster whose commercials were skipped. The reader will appreciate, as described herein, the ccDVR system 1133 comprises a plurality of cloud systems 1135 and a plurality of DVR devices 1182 in viewer systems 32A-N, likely distributed in geographically disparate locations, but interconnected over a wide area network, such as the Internet, and owned or leased by valid subscribers of content. In one embodiment, a ccDVR subscription user agreement authorizes the server 1180 and any DVR 1182 within the collaborative cloud system to record content from a content source on a subscriber's behalf, as part of the collaborative upload effort.

Although the collaborative system has been described, in the illustrative embodiments, with content objects which may be in the nature of streamed video or other data, such example should not be limiting. The content objects uploaded or downloaded by the DVR or other devices disclosed herein may include textual, graphic, photographic, audio, haptic or other data type, in a streamed or a stream format, regardless of data format or protocol, content objects containing such data types being equally applicable to the system described herein.

Viewer Systems

Figure 3A:
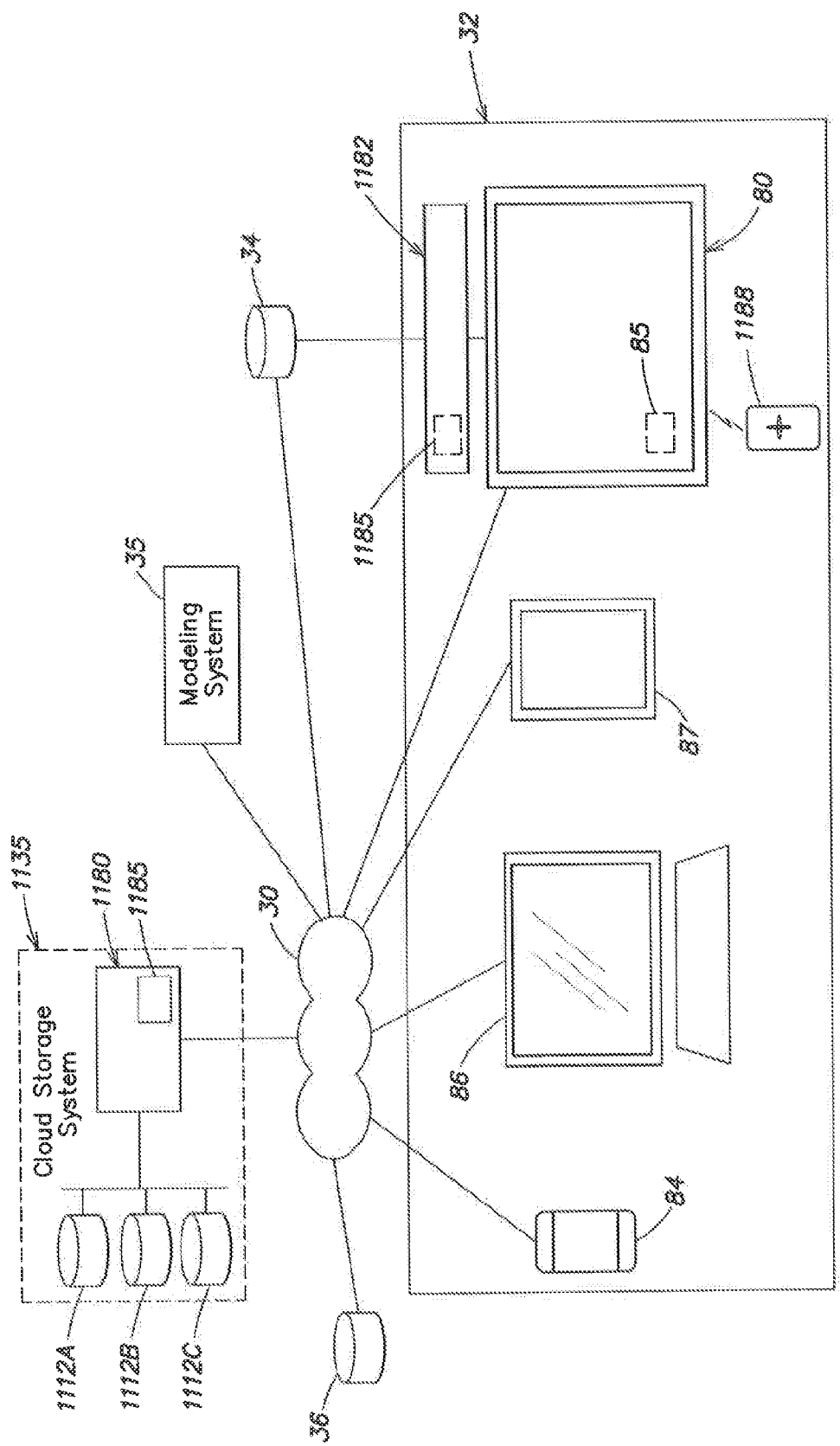
FIG. 3A illustrates conceptually a collaborative cloud DVR system in accordance with the disclosure.
Figure 3B:
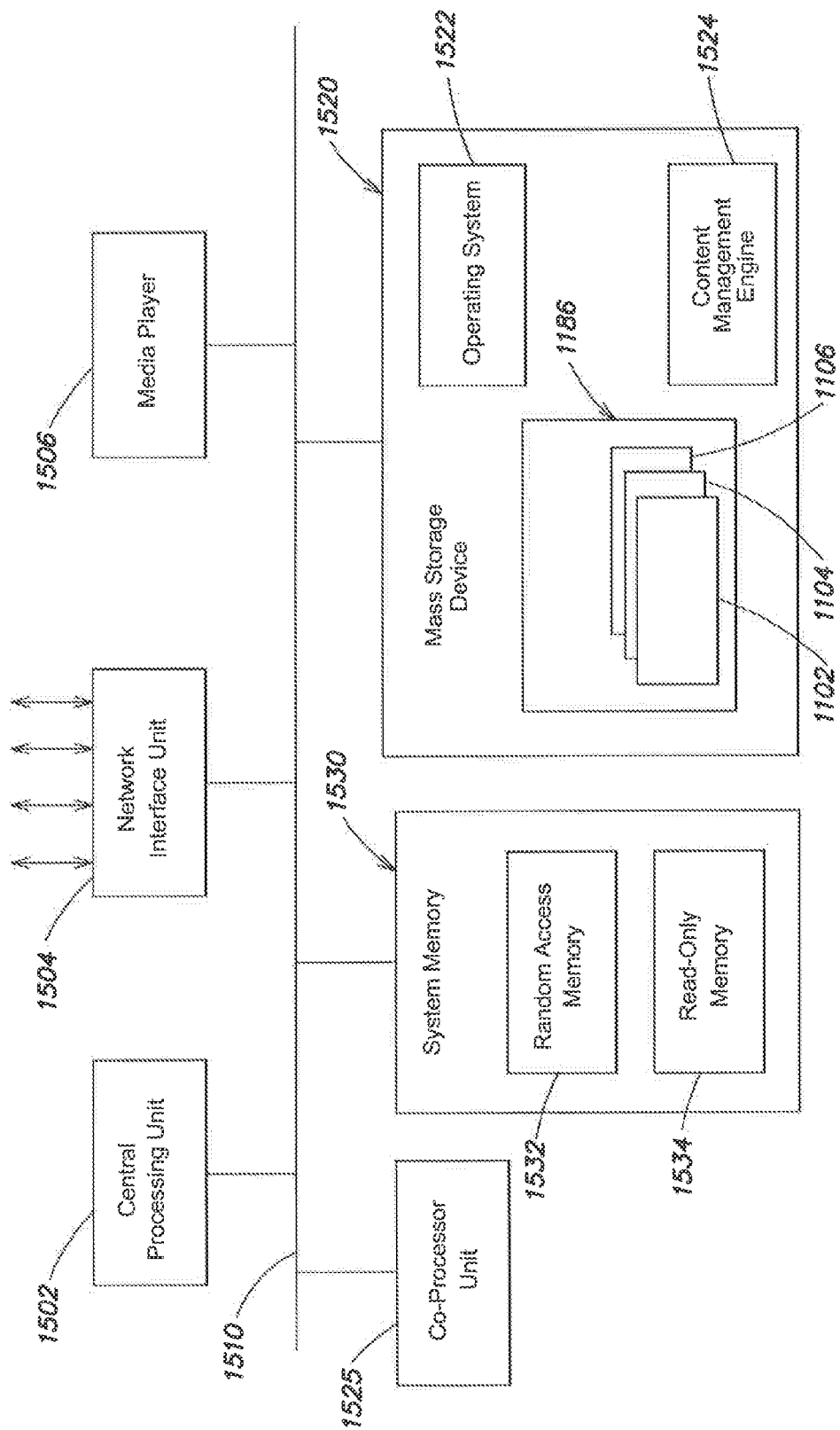
FIG. 3B illustrates conceptually a DVR device in accordance with the disclosure.

FIG. 3A illustrates conceptually a viewer interface system 32 relative to public network 30, content provider sources 34 and 36 and modeling system 35 in accordance with the disclosure. Also illustrated in FIG. 3A is the remote control 1188 associated with display 80. The viewer system 32 comprises a first or right brain user interface display 80, used predominantly for viewing of video content which, in the illustrative embodiment, may be implemented with television display 80 and an accompanying remote control 1188. Display 80 may be implemented with a "connected TV" or other devices that connect the TV to the networks 30 or 31 such as a mini-PC, a connected Blu-ray player or a connected game console, e.g. a device capable of connecting directly to the Internet, e.g. network 30, as well as a cable packet network or satellite network, e.g. network 31. Viewer system 32 further comprises a second or left brain user interface 84 which presents a content surfing interface and purchasing interface and may be implemented on a Personal Digital Assistant (FDA) or smart phone, tablet computer or even laptop computer. Such second user interface predominantly uses and/or stimulates activity in the left hemisphere of the human brain, and also, to a limited extent, the right hemisphere of the human brain. A viewer will typically utilize the second user interface 84 to perform activities such as indicating his TV subscription, making his recordings, purchasing, managing his profiles, changing the order of, specifying a like/dislike for a particular content object within the rankings of a channel. Viewer system 32 further comprises optional, third and fourth user interface 86 and 87, respectively, capable of presenting both the textual based interfaces for content management, surfing and purchasing, as well as visual content and may be implemented with a traditional personal computer, including a desktop or laptop system, as well as other systems. In an exemplary embodiment, display 80 presents visual, non-textual information while one, two or all three of phone/PDA 84, personal computer 86, and/or tablet computer 87 display a combination of textual information, or other textual based data and visual information. The predominance of brain activity for the various user interfaces in viewer system 32 is indicated in the table below:

---
Display 80: full Right, minimal Left
Tablet 87: limited Left, full Right optionally
Smartphone/PDA 84: mainly Left, limited Right
Personal Computer 86: full Left, full Right optionally
---

In the disclosed embodiments, the elements of viewer system 32 may be implemented with existing commercially available technology. For example, display 84 may be implemented with any number of smartphones or personal digital assistant devices including, but not limited to the Apple iPhone and Android operating system based smartphones commercially available from any number of manufacturers including Samsung, HTC, Alcatel, Acer, Sony Ericsson, HTC, LG, Google Nexus, ZTE, Motorola, etc. This display 87 may be implemented with the tablet computer including, but not limited to the Apple iPad and Android operating system based tablets, commercially available from any number of manufacturers including Acer, Archos, Dell, Motorola, Samsung, Sony, Toshiba, ZTE, etc. . . . As described previously, display 80 may be implemented with a connected TV, as well as traditional television display devices which rely on supplemental equipment, such as set top box 1182, for connection to a source of content, including, but not limited to those commercially available from any number of manufacturers including LG, JVC, Panasonic, Philips, Samsung, Sharp, Sony, etc.

Display 86 may be implemented with any number of computer systems including, but not limited to the Apple iMac and IBM PC compatible personal computers, commercially available from any number of manufacturers including Acer, Hewlett-Packard, Asus, Samsung, Sony, Dell, Toshiba, etc. Set top box 1182 may be implemented with any number of commercially available set-top box devices, Mini PC's, stick based mini-Pc's, or gaming platforms of either an open architecture or proprietary architecture, including those commercially available from any number of manufacturers including Sony Playstation, Apple Mac Mini, Nintendo Wii, Microsoft Xbox, etc. Remote 1188 may be implemented with any number of standard design remote controls from TV manufacturers, or, alternatively, may be implemented with an after market remote such as those manufactured by Logitech, Inc. Viewer system 32 further comprises a Digital Video Recorder (DVR) device 1182 hour each of these methods is the with the replacement sheet is one of the listed as they are this of this please copy is a little bit smudgy but it is taking place which is which is operably connected, directly or via public network 30, to content provider sources 34 and 36, modeling system 35, and as well a cloud storage system 1135 in accordance with the disclosure.

FIG. 3B illustrates conceptually the internal architecture of DVR device 1182 which, in one embodiment, comprises a central processing unit 1502 (CPU), a system memory 1530, including one or both of a random access memory 1532 (RAM) and a read-only memory 1534 (ROM), and a system bus 1510 that couples the system memory 1530 to the CPU 1502. An input/output subsystem containing the basic routines that help to transfer information between elements within the illustrative computer architecture, such as during startup, can be stored in the ROM 1534. DVR 1182 may further include a mass storage device 1520 for storing an operating system 1522, software, data, and various program modules, as described herein.

The mass storage device 1520 may be connected to the CPU 1502 through a mass storage controller (not illustrated) connected to the bus 1510. The mass storage device 1520 and its associated computer-readable media can provide non-volatile storage for DVR 1182. Although the description of computer-readable media contained herein refers to a mass storage device, such as a hard disk or CD-ROM drive, it should be appreciated by those skilled in the art that computer-readable media can be any available computer storage media that can be accessed by DVR 1182. By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by DVR 1182.

According to various embodiments, DVR 1182 may operate in a networked environment using logical connections to remote physical or virtual entities through a network such as the network 30 through a network interface unit 1504 connected to the bus 1510. It will be appreciated that the network interface unit 1504 may also be utilized to connect to other types of networks and remote computer systems, such as a cloud storage system 1135 and modeling system 35. Network interface unit 1504 may comprise a number of input output ports including, but not limited to, both a co-axle high-frequency input as well as an ethernet or HDMI input and either an HDMI or SCART or component VGA output to a television/display device 80, as illustrated in FIG. 3A. The co-axle high-frequency input may function as an input for sources of content in accordance with the packet protocol/standard, such as the Data Over Cable Service Interface Specification (DOCSIS) cable modem standard, utilized by a cable television and/or a satellite television content provider. Another standard by which content sources may provide streamed content objects to viewer systems 32 is the ClearQAM or CLAM (quadrature amplitude modulation), format by which digital cable channels are encoded and transmitted via cable television providers. In addition, the network interface of DVR 1182 may be provided with one or more USB ports for interfacing with other devices including modems, other computers, IR dongles, hard drives or other network interoperable components including CI card readers. In addition, DVR 1182 may be provided with wireless transceiver for interfacing with other wireless devices according to one of the plurality of standard wireless protocols, including Wi-Fi for either uploading or downloading of content over a network. In the contemplated embodiment, an internet upload connection (may be the same or different from the download connection), e.g. Ethernet glass fiber based.

In one embodiment, DVR 1182 is coupled to a media player 1506, such as a DVD and Blu-ray playback and recording apparatus. In another embodiment, DVR 1182 may have built-in Common Interface (CI) functionality or connectable to network interface unit 1504 via a USB port or other peripheral interface such as a PCMCIA interface. In another embodiment, the various interfaces of network interface unit 1504 may be designed for communicating with a remote docking station for any of an iPhone, iPad, Personal Computer or Android smartphone, or other similar devices, which enables streamed transmission of content and command instructions therefrom to DVR 1182.

DVR 1182 may also include an input/output controller for receiving and processing input from a number of other devices, including remote 1188 and, possibly, any of a keyboard, mouse, game controller or other device. The network interface unit 1504 of DVR 1182 may further comprise a wireless remote 1188 and interface for communicating therewith, similar to the other remotes described herein which may be implemented with any type of technology, including, infrared, radiofrequency, or wired analog or digital signals, etc.

Similarly, an input/output controller may provide output to a video display 80 through a standard display connection, such as any of a HDMI, VGA, S-video, YPbPr, SCART and component, EuroSCART, Euroconector, EuroAV, or EIA Multiport etc. Further, input/output controller 1115 may be connected to a printer, or other type of peripheral device. DVR 1182 may further comprise an additional processor unit 1525, such as a Chip SmartTV, connected to the bus 1510 which may be utilized for decoding encoded content objects received from a content source.

A number of program modules and data files may be stored in the mass storage device 1520 and RAM 1532 of DVR 1182, including an operating system 1522 suitable for controlling the operation of DVR 1182 in a network computing environment. The mass storage device 1520, ROM 1534, and RAM 1532 may also store one or more program modules for execution by the CPU 1502. The mass storage device 1520, the ROM 1534, and the RAM 1532 may store software instructions that, when loaded into the CPU 1502 and executed, transform a general-purpose computing system into a special-purpose computing system customized to facilitate all, or part of, the techniques disclosed herein.

In the illustrative embodiment, DVR 1182 comprises a client application process 1186 for interfacing with content provider sources 36 or 34 and cloud storage system 1135. Specifically, application 1186 comprises an interface process 1102 and upload/download streaming process 1104 and optional electronic program guide process 1106. Interface process 1102 enables viewer system 32 to interact with sources 36 or 34 and cloud storage system 1135 in a manner similar to that described herein while process 1104 interacts with process 1102 and content sources 36 or 34, and, where applicable, a scheduling application or electronic program guide function 1106 associated with content source 36 in a manner described herein.

The CPU 1502 may be constructed from any number of transistors or other circuit elements, which may individually or collectively assume any number of states. More specifically, the CPU 1502 may operate as a state machine or finite-state machine. Such a machine may be transformed to a second machine, or specific machine by loading executable instructions contained within the program modules. These computer-executable instructions may transform the CPU 1502 by specifying how the CPU 1502 transitions between states, thereby transforming the transistors or other circuit elements constituting the CPU 1502 from a first machine to a second machine, wherein the second machine may be specifically configured to manage the generation of indices. The states of either machine may also be transformed by receiving input from one or more user input devices associated with the input/output controller, the network interface unit 1504, other peripherals, other interfaces, or one or more users or other actors. Either machine may also transform states, or various physical characteristics of various output devices such as printers, speakers, video displays, or otherwise.

Encoding of executable computer program code modules may also transform the physical structure of the storage media. The specific transformation of physical structure may depend on various factors, in different implementations of this description. Examples of such factors may include, but are not limited to, the technology used to implement the storage media, whether the storage media are characterized as primary or secondary storage, and the like. For example, if the storage media are implemented as semiconductor-based memory, the program modules may transform the physical state of the system memory 1530 when the software is encoded therein. For example, the software may transform the state of transistors, capacitors, or other discrete circuit elements constituting the system memory 1530.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

FIG. 1 illustrates a plurality of viewer systems 32*a-n* operably coupled to both a content source 36 and a cloud storage system 1135. Viewer systems 32*a-n* may be implemented as described previously herein with reference to FIGS. 3A-B, including the addition of DVR 1182 and remote 1188. Content source 36 may contain indexed content material, or, may comprise any of Cable TV service provider through cable packet network, Satellite TV service provider through satellite network, or live broadcast over the Internet (Internet TV), Internet protocol-based TV subscriptions, such as those available from Verizon, and Free To Air TV. Public network 30 may have a network topology as described elsewhere here in or any other configuration which interoperatively couples the disclosed network components.

Note that the content storage configuration for either of the original content source or cloud storage server may be centralized or distributed or continuously migrating in a peer-to-peer fashion to achieve content storage at any single instant. In one embodiment, the content is captured at a viewer system, either unencrypted or post decryption, and provided to the cloud storage device in an unencrypted format. In another embodiment, the content is provided to the cloud storage server in an encrypted format along with or without a decryption key data which may be stored separately from the encrypted content. The algorithm for uploading and downloading of content data packets at the cloud storage server may utilize temporal or sequential identifiers associated with the content.

In the illustrative embodiment, to join the collaborative cloud community and initialize the components of the system, the end-user/viewer buys a DVR 1182, which has pre-installed thereon client application 1186. Next, the end-user registers DVR 1182 with a server 1180 associated with the cloud storage system 1135. Such registration process may be performed online with a browser application executing in any of DVR 1182 or any of devices 84, 86, 87 or 80, by accessing the server 1180. Such registration process may include uploading of any number of user identification indicia including, but not limited to, name, serial number of the DVR 1182, billing address, payment information, identification of current content subscription sources, network access protocol identifiers and addresses, as applicable, initial recording settings and preferences for the DVR 1182, identifiers of content to be recorded, acknowledgment of the license terms and conditions for the collaborative upload system and/or the client software on the DVR 1182. Upon completion of such registration process, server 1180 creates a record associated with the subscriber/DVR 1182. The user can also at any time change the current recording instructions through the website interface provided by server 1180, as described in registration procedure.

Following registration, the client application 1186 on the DVR 1182 receives the recording settings from the server 1180 over a network connection, e.g. a Wi-Fi or ethernet Internet connection. The user can at any time change the recording instructions using a remote control 1188 associated with the DVR 1182 by, for example, pushing the red button on the remote control, when viewing an episode of the series, to stop recording that series or by pushing the blue button on his remote control, while viewing an episode, to start recording that series. The client application 1186 receives the commands from the remote 1188 and transmits the new recording instruction to the server 1180, where content is stored in association with cloud storage system 1135.

Referring to FIG. 2, DVR 1182 interacts with content source 36 and cloud storage system 1135, via process 1102 and 1104, in the following manner. The viewer requests, through process 1104, one or more content objects representing programs which are currently accessible for streaming from the content source 36 to viewer system 32. The determination of such accessibility will typically be defined by the viewer's subscription agreement with the content source provider and the availability of specific content as set forth by the content provider. Optional electronic programming guide process 1106 may assist the viewer in selection of available content. Each time process 1104 identifies content to which the viewer has legally authorized access and which he or she has requested recording thereof, process 1104 transmits the metadata identifying such content to cloud storage server 1180 which stores information with the profile of the registered DVR 1182. At the time indicated by the metadata defining the content, server 1180 establishes a network connection with process 1102 and waits for process 1104 to initiate download streaming of the content from content source 36 to one or more buffer memories within DVR 1182, along with selected metadata associated with content, including data identifying the content, and one or more temporal or sequential identifiers or markers identifying the specific portion of the content contained within the buffer, as illustrated by arrow A of FIG. 2. In one embodiment, content can be uploaded directly from a DVR device 1182 to cloud storage system 1135 without the need for a substantial buffering of the streamed data representing the content object.

In the algorithmic process to capture and upload a content object from a viewer system 32 to cloud storage system 1135 portions of the uploaded content object may be between 0% and 100% and such portions are uploaded to cloud storage system 1135. Process 1104 transmits to process 1102, one or more packets of data along with the information identifying the content, or, alternatively, provides the addresses in memory where such information is stored locally within DVR 1182 and accessible by both processes. Process 1102 appends to this information, a data structure and transmits or streams such information to cloud storage system 1135, as illustrated by arrow B of FIG. 2. In one embodiment, the data structure may comprise data identifying the content object and/or a portion thereof, temporal or sequential identifiers associated with the content object, and authorization indicia identifying a viewer process and DVR 1182. In addition, data structure may further optionally comprise data identifying a viewer process and data identifying an encryption key for decrypting the content object. In one embodiment, process 1102 may query server 1180 of cloud storage system 1135 to determine if a complete copy of the requested content was successfully received and stored therein. If server 1180 determines that a specific segment of the content object is missing, server 1180 will modify the metadata in the data structure associated with the content object, e.g. by setting a flag variable, as being incomplete.

The functionality performed by processes 1104 and 1102 is repeated, as needed, and as authorized by server 1180, while display device 80 is operably connected to content source 36, for all content to which the viewer process has requested. In addition, the functionality performed by process 1104 occurs typically without any video or audio content being provided the actual display 80. In this manner, such process may be conducted while the viewer is not utilizing the system, e.g. during system "down time" or watching other content and transparently without the viewer being aware.

Figure 4:
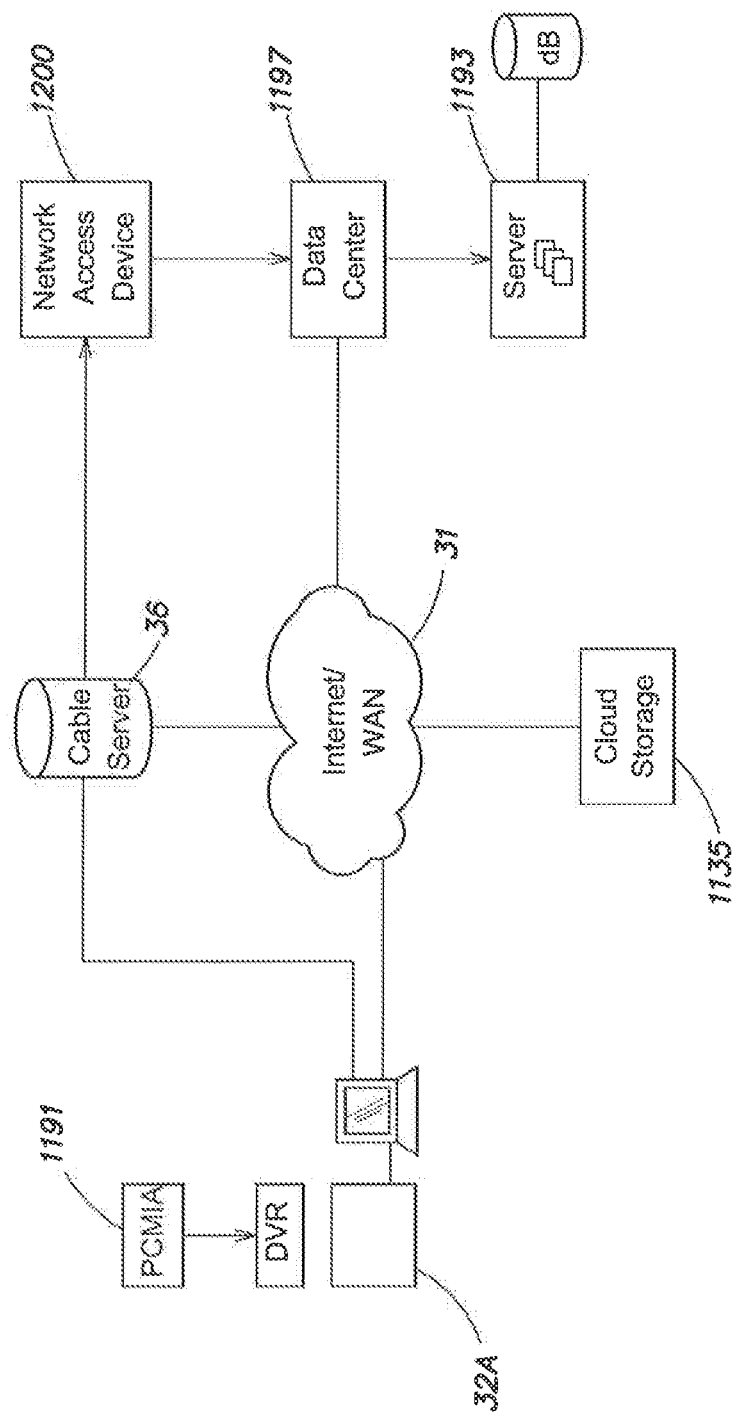
FIG. 4 illustrates conceptually a collaborative shared receiving apparatus may be implemented in accordance with the disclosure.

FIG. 4 illustrates conceptually a collaborative system in accordance with an embodiment of the disclosure. In such an embodiment, a source of content 36 is component of a cable distribution infrastructure and is connected to data center 1197 which, in turn, is connected to server 1193. Server 1193 may transmit content data to cloud storage system 1135 operatively coupled to the Internet for storage thereat. In addition, executing on server 1193 are authentication modules and digital rights management modules which interact with the plurality of PCMCIA rights profiles provided from members of the collaborative community and stored in the server database. A DVR or set top box associated with viewer system 32 is capable of receiving a PCMCIA card or other rights indicia mechanism 1191 which defines the digital rights of the viewer's system. Server 1193 similarly may store PCMCIA authentication information in and associated database thereof for authenticating the access rights of the viewer system 32A. Note that cable source 36 may be connected to any of the Internet, viewer system 32A, and data center 1197.

In other variations of the disclosed embodiments herein, the checking of the implied right to copy may be performed at the time of making the copy, or, alternatively, at the time prior to time-shifted the unicast. At the time just prior to time-shifted unicasting, based on the request of an individual community member, the fact if the user has given the recording instruction is checked and the implied or explicit right of that member is checked.

One or combination of the following authorization mechanisms 1191 or techniques, may be utilized to verify the rights of a viewer, including, but not limited to: a) postcode and country for free to air, b) card bought or licensed from cable operator or other provider of broadcasting signal, c) an API call from a viewer system DVR player to an operator, d) an electronic invoice or electronic copy of a paper invoice, e) statistically checking an 'authorization certificate' over a period of time. One or more of these mechanisms may be maintained and implemented in conjunction with the server 1193 and the authentication modules and digital rights management modules executing thereon in a manner similar to that described above with reference to the use of PCMCIA rights profiles.

Figure 5:
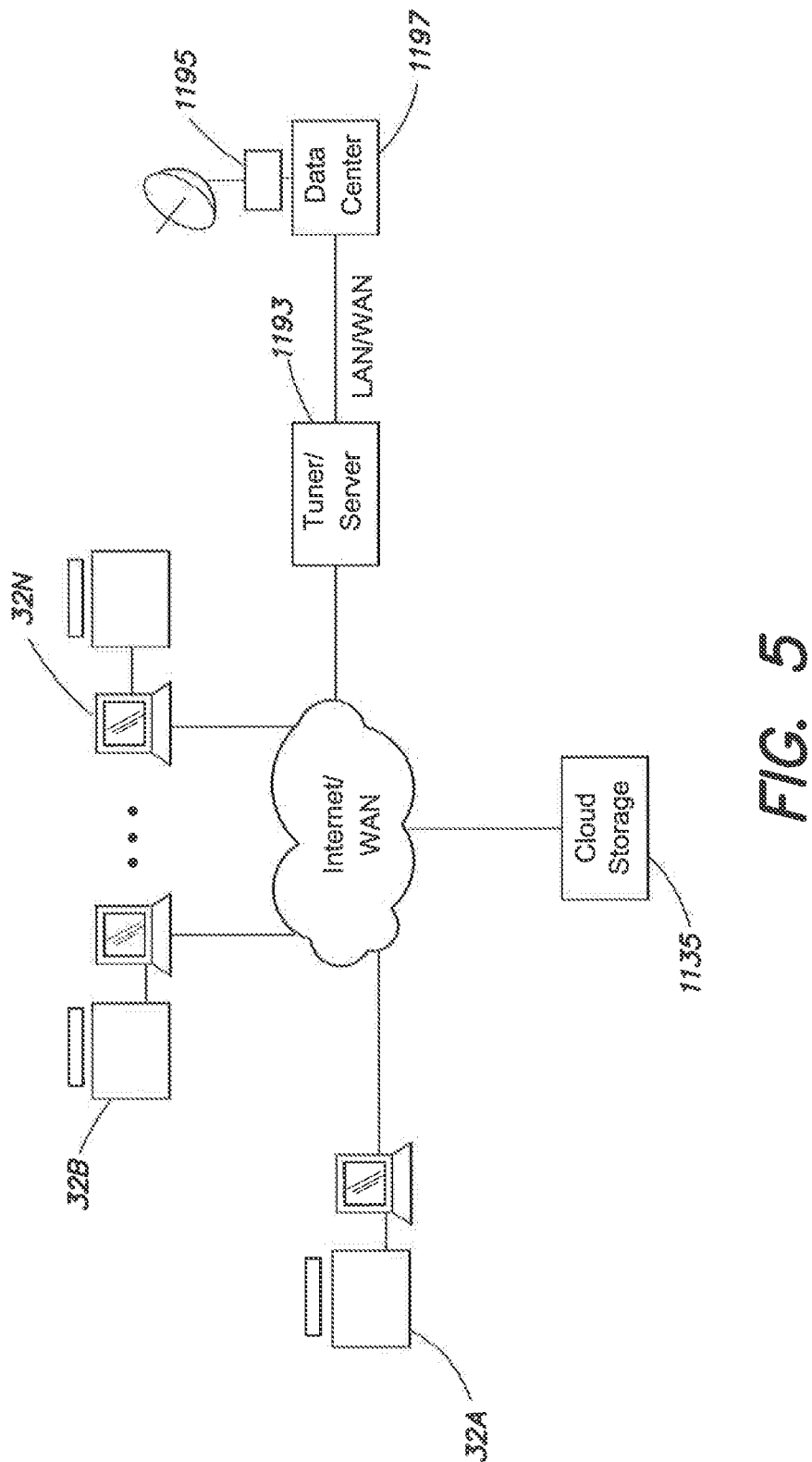
FIG. 5 illustrates conceptually a collaborative shared antenna may be implemented in accordance with the disclosure.

FIG. 5 illustrates conceptually a collaborative shared antenna system in accordance with an embodiment of the disclosure in which the receiving antenna 1195 is coupled to a data center 1197 which, in turn, is coupled to a server 1193. In the illustrative embodiment, tuner/server 1193 includes one or more tuner cards, responsive to microwave transmissions, and pulls or acquires data from receiving antenna 1195. Users/Viewers give the record instruction to record certain channels, series or programs. This content, which is received by the collaborative shared antenna, is then transmitted to the shared memory space of cloud storage system 1135 and stored therein.

FIGS. 6A-B illustrate conceptually a collaborative shared antenna system in accordance with an embodiment of the disclosure. In such an implementation, the collaborative shared receiving apparatus, in this case antenna 1195, is located within the network infrastructure at a point between collaborative cloud system 1135 and one or more viewer systems 32A-N and is capable of download streaming content to any one of the viewer systems 32 at a time t1, here illustrated as viewer system 32B, from a transmitter/transceiver associated with cloud system 1135, such transmitter itself possibly being an antenna. FIG. 6B illustrates how antenna 1195 may be similarly utilized to download content into a different viewer system 32E at time t2.

FIGS. 7A-B illustrate conceptually another collaborative shared antenna system in which a pair of collaboratively shared antennas 1195A-B are capable of download streaming content to any one of the viewer systems 32 at a time t1, here illustrated as viewer system 32A, from a transmitter/transceiver associated with cloud system 1135. FIG. 7B illustrates how antenna 1195B may be similarly utilized to download content into a different viewer system 32F at time t2. In such an embodiment, the transmitter/transceiver of cloud storage system 1135 determines which antenna 1195A or 1195E receives the stream of downloaded content following authorization other respective requesting viewer system 32.

Collaborative Pre-Emptive Copying for Time-Shifted Viewing

In one embodiment, the content object representing content may be copied either singularly or collaboratively by viewers prior to its actual broadcast from the content source. In such implementation, a viewer or a community of viewers may have prearranged with the author or other entity holding the relevant rights to the content, prior to any future distribution arrangement, for rights to create a private copy for viewing as well as to upload and/or download such copy for storage and later retrieval in a time shifted matter. This implementation lends itself to certain scenarios such as technical, academic and or religious societies, certain professions or other groups whose members had either implicit or explicit rights to all content generated by one of their respective members or a third party offer outside of the community. In such scenarios, the rights of the viewers may precede any commercial distribution arrangement the author may have with a distribution entity, such as a cable service provider or television network broadcasting entity.

Referring to FIG. 1, prior to the process illustrated by process step A, a collaborative copy may be generated just immediately prior to its broadcast from content source 36 and antenna 1190 to cloud storage system 1135 and antenna 1195, respectively. Such pre-step may generate the collaborative copy as previously described herein from a community of viewers, with the content source 36 being in communication over a network with one or more of the viewers as well as system 1135 to verify the appropriate copying and viewing rights of the collaborative community.

Specifically, one or a plurality of viewers enter into an agreement with the author or rights holder of the content which enables a viewer to make a private copy of the content and to store such content copy either locally or remotely using any of the system architectures described herein. Typically, the authorization information may be stored in system 1135, as previously described herein. Further, such authorization may have any data format and may be stored in any data structure suitable for efficient verification purposes. The verification mechanisms utilized by the system 1135 may be implemented with any such mechanisms described herein or in any of the priority documents or issued patent noted or incorporated herein. A collaborative copy of the content may be made and stored along with the authorization data prior to its transmission to a content source, such as a cable service provider, or the collaborative copy may be generated as described elsewhere herein, e.g. following receipt of the stream of data representing the content object through a shared facility. Alternatively, a collaborative copy may be generated following receipt of the data comprising the content object following its broadcast for transmission from the content source. In this manner, the timing of the generation of the collaborative copy is asynchronously related to the establishment of authorization to view such copy or to participate in the collaborative creation there of, provided that authentication of such rights occur at some point prior to time shifted viewing of the content by an authorized viewer or community member. Utilizing the above concept, in the system disclosed in either FIGS. 4-5, one or more viewer systems 32A-N associated with users who have previously been granted rights for copying and storage of a content object for later time shifted viewing, either by the author of the content or other party holding such rights, may transmit their authorization indicia to system 1135 for storage therein. Thereafter, at the time of requesting download viewing of the content, the server 1193 or system 1135 itself will verify if the requesting viewer system has appropriate authorization for receiving a download streaming copy of the content object for viewing in a time shifted manner. A collaborative copy of the content object may be generated either collectively through upload transmission of fractional portions of the content object from each of the viewer systems 32 or through receiving a copy of the content from a source 36 through a common receiving facility, such as antenna 1195 of FIG. 5 or cable network component 1200 of FIG. 4. Such collaboratively generated copy may be stored within the cloud storage system 1135 or server 1193. Note that the time of generating such collaboratively copy may precede its availability from the content source so that a viewer system having prearranged rights for storage and time shifted viewing of the content may actually have to wait until it is made available from the content source, which time period may be insignificant or maybe considerable, without appreciable effect on the processes described herein. Once the content has been broadcasted, either wirelessly or over a portion of the cable network infrastructure, an additional collaborative copy may optionally be made by any of the systems described herein and the additional collaborative copy then utilized for unicast streaming to one or more requesting viewer systems 32 in a time shifted matter.

In any of the embodiments disclosed herein, the content unicast to a viewer system 32 may comprise the video signals, which were originally broadcast from a source prior to being received and stored as a collaborative copy in accordance with this disclosure.

Collaborative Network Media Appliances

FIGS. 8-9 illustrate conceptually a collaborative set-top box (STB) system in accordance with the disclosure. As shown in FIG. 8, a collaborative system for more efficiently viewing streamed content in a time shifted manner comprises collaborative set-top box system 1202 comprising a home component, home STB 1204, and a cloud component, cloud STB 1206. The cloud STB 1206 may further comprise a network accessible distributed component 1206A-n and/or a cross licensed portion of other home STBs. The home STB 1204 may be connected to the cloud STB 1206 and other home STBs 1204 over any local or wide area network topology infrastructure, such as the Internet. A group of home STBs 1204A-n may be cross licensed to each other within a community of users sharing common viewing rights through broadcast subscriptions or geographical determined rights to free-to-air broadcasts.

As illustrated in FIG. 9, the collaborative STB 1202 may comprise multiple home STB's 1204A-N and cloud STB 1206, as illustrated by the dashed line surrounding such elements. Within the domain of the collaborative STB 1202, an implementation comprises STB 1204B and 1204N, as illustrated by a "-x-" dashed line surrounding such elements. Another implementation comprises STB box 1204A in combination with cloud STB 1206, as illustrated by the dot/dashed line surrounding such elements. In all three implementations, the collaborative STB 1202 provides enhanced memory and/or receiving and playback functionality in comparison to the traditional set-top box. Note in FIG. 9, selected or all of STB 1204A-N may comprise a community of users who have cross licensed their STB to the other users and who have the same license rights to the respective content. Also, in cloud STB 1206, memory components for individual home STBs 1204 are designated as 1208A-n.

Referring to FIG. 8, the cloud STB 1206 may comprise any of a collaborative receiving device 1212 (cable, antenna or otherwise), collaborative tuners 1214a-n, collaborative rights verification devices and/or software 1216, collaborative decoding 1218, and/or a collaborative time-shift copy system 1220 and play back system 1222 with functionality implemented in either hardware and/or software. The home STB 1204 may have, at least one or no tuner 1214, as well as, at least one or no rights verification and decoding device and/or software module 1207. The rights verification device (e.g. a smart card reader) may be used to verify broadcast viewing rights or can read such information from the cloud STB 1206. In one embodiment, a collaborative STB 1202 features functionality similar to STB 1204, including a DVR module 1209 with DVR functionality and/or the ability to interact with a right brain interface 1211, such as that described in U.S. Pat. No. 8,301,770, van Coppenolle et al. entitled Method And Apparatus For Distributed Upload Of Content.

Effectively, the collaborative STB 1202 has increased memory and/or receiving/playback functionality when compared to traditional set-top boxes. Adding memory space to the home STB 1204 allows for peer to peer streaming and sharing home memory space without violating or transferring viewing rights. Such distributed STB/DVR functionality may also be supported by cloud back-up or long term cloud copies per viewing community. The cross licensed home STBs and DVRs and licensed cloud STBs and back-up storage collectively form a collaborative STB/DVR system, without cloud DVR functionality, but instead with distributed DVR functionality. Peer to peer streaming, without using third party infrastructure in the cloud, excludes third party involvement in the distributed STB/DVR process. An antenna or cable connection in the home STB enables collaborative receiving without having a receiver in the cloud. Excluding the cloud from the collaborative STB/DVR may be necessary in certain jurisdictions where a cloud DVR is not legal. In such case, the collaborative STB/DVR becomes distributed STB/DVR, without being a cloud STB/DVR.

Utilizing the systems described in FIGS. 8-9, a peer to peer and/or cloud STB/DVR system, with collaborative shared (local home based or distributed or cloud-based) functionality, hardware and software for receiving, tuning, rights verification, decoding, recording, temporary, permanent or back-up storage memory space, may be obtained without the risk for any transfer or violation of rights, since all members of the community already share the same rights; before entering into a cross licensing of hardware and systems rights are checked separately.

In various embodiments, the system and techniques described here in enable methods for one or more of the following: 1) local and/or cloud based and/or distributed (in the cross licensed network of home STBs) rights verification, using card or e-invoice, API, electronic signature, or otherwise; 2) local and/or cloud based and/or distributed (in the cross licensed network of home STBs) tuning and/or decoding; 3) local and/or cloud based and/or distributed (in the cross licensed network of home STBs) recording for time-shifting; 4) peer to peer, distributed STB/DVR, featuring local home memory space, excluding the need for third party cloud infrastructure; 5) peer to peer, distributed STB/DVR, with cloud back-up memory space, including again the cloud; and 6) peer to peer, distributed STB/DVR, with cloud storage memory space, making a combined cloud and distributed STB/DVR.

By using collaborative receiving, receiving cost can be reduced. By using a cloud rights verification system, rights verification costs can be reduced. By collaboratively receiving a content broadcast signal in the cloud and viewing it privately in a time shifted manner, receiving costs are also reduced, the STB therefore also becomes a DVR.

FIGS. 10-12 illustrate conceptually other collaborative set-top box systems in accordance with the disclosure. As shown in FIGS. 10-12, a collaborative system for efficiently viewing streamed content in a time shifted manner comprises collaborative set-top box (STB) system 1202 comprising a home component, the home STB 1204 of a viewer system 32, and a cloud component, the cloud STB 1206. The home STB 1204 is connected to the cloud STB 1206 and any other home STBs 1204B-N over any local or wide area network topology infrastructure, such as the Internet. As described previously herein, a group of home STBs 1204A-N may be cross licensed to each other within a community of users sharing the same viewing rights through broadcast subscriptions or geographical determined rights to free-to-air broadcasts.

As shown in FIGS. 10-12, the cloud STB 1206 may comprise, in various embodiments, network accessible STB component 12048 and network accessible DVR component 1209 as well as a collaborative shared receiving mechanism, such as an antenna system or network infrastructure component, as described elsewhere herein, and is capable of download streaming of content to any one of home STBs 1204A-N. The cloud STB 1206 may further comprise any of a collaborative receiving device (cable, antenna or otherwise), collaborative tuners, collaborative rights verification devices and/or software, collaborative decoding, and/or a collaborative timeshift copy system and play back system with functionality implemented in either hardware and/or software, similar to that described elsewhere herein.

As shown in FIGS. 10-12, the STB box 1204A in combination with cloud STB 1206, provides enhanced memory and/or receiving and playback functionality in comparison to the traditional set-top box. Note in FIG. 10, selected or all of STBs 1204 of viewer systems 32A-N may comprise a community of users who have cross licensed their STB to the other users of the community and who have the same license rights to the respective content. Also, in cloud STB 1206, memory may be designated for individual home STBs 1204A-N, either in the shared cloud infrastructure or in the home STB box itself. In addition, the home STB 1204 may have, at least one or no tuner, as well as, at least one or no rights verification and decoding device and/or software module.

As illustrated in FIGS. 10-12, a collaborative STB 1202 features a DVR module 1209 with DVR functionality. In another embodiment, collaborative STB 1202 features DVR module 1209 with the ability to interact with a right brain interface of a home viewer system 32, which may or may not include a mobile apparatus 1207 for presenting streamed content, such as a tablet computer, personal digital assistant or mobile phone, as illustrated in the FIGS. 10-12.

As is with the other system embodiments described herein, by using a collaborative receiving technique, receiving cost can be reduced. By using a cloud rights verification system, rights verification costs can be reduced. Further, by collaboratively receiving the broadcast signal in the cloud and viewing the content privately in a time shifted manner, receiving costs are also reduced, the STB therefore also functions as a DVR.

Collaborative Appliances Utilizing Prioritized Local Storage of Recommended Content According to another aspect of the disclosure, collaborative STB system 1202 features DVR module 1209 with the ability to interact with a content recommendation system such as that described in U.S. Pat. No. 8,301,770, by Van Coppenolle et al. entitled Method And Apparatus For Distributed Upload Of Content, the subject matter of which is incorporated herein by this reference for all purposes. In such a recommendation system, the traditional recommendation engine paradigm is reversed to achieve more accurate predictive model which mimics the subject's emotional motivations. Rather than classifying "subjects" objectively, the disclosed system and technique classify "objects" subjectively relative to an individual's (or small group of individuals, e.g. a family) behavior so that the resulting group of objects can be ranked and presented in a manner that provides greater emotional motivation for selection according to the individual's specific subjective desires and reluctance tastes. In the disclosed system and technique, a plurality of content objects, such as videos, music, art, books, consumer goods, financial instruments, etc., are subjectively analyzed according to a specific individual's taste and behavioral history and presented to the individual in rankings or "channels" which can be explored or "surfed" multi-dimensionally. Specifically, content objects are processed through a unique neuropsychological modeling engine, utilizing data specific to an individual or group of individuals, and arranged according to their eligibility and the magnitude the individual's predicted emotional motivation to select or purchase a content object. In an exemplary embodiment, once a content object is determined to be eligible based on an individuals behavioral data and mood, a ranking position within a channel, representing the individual's emotional motivation to select such content object, is determined. Content objects are arranged in a first selectable dimension, according to a desire and fear vector, that is, from lower to higher emotional motivation for possible selection and presentation according to an individual's behavioral data. Content objects may be further arranged according to a second selectable dimension based on a time vector. As contemplated, multiple sequentially arranged versions of content objects which share one or more common parameters or metadata values, such as episodes within a television series, or prequel/sequel movie releases, or books with a series, are arranged chronologically, allowing selection either forward or backward chronologically from a currently selected content object.

In one embodiment, the recommendation/modeling system 35, as illustrated in FIG. 3A, comprises a neuropsychological modeling engine, a ranking application, and a behavior modeler all of which communicate with each other as well as with a storage mechanism, typically a plurality of databases, and a presentation system over either public or private networks. Such a system is contemplated to interact with any of the collaborative set-top box systems disclosed and described herein, whereby greater efficiencies are legally achieved by collaboratively sharing bandwidth and cloud storage capacity among a plurality of individual client DVR devices. Such a collaborative system is further described in U.S. Pat. No. 8,433,815, by van Coppenolle et al., entitled Method And Apparatus For Collaborative Upload Of Content, the subject matter of which is incorporated herein by this reference for all purposes. In such collaborative systems, each owner/user of a DVR device authorizes his or her individual DVR device to be utilized by both the cloud storage system server and any other owner/user of a DVR device in the respective community and receives similar permission in return. In this manner, the collaborative cloud storage community, which comprises the cloud storage system and all participating DVR devices or STB devices (also referred to herein as a DVR/STB or STB/DVR system), act collectively as a single entity authorized by the individual users/viewers to upload, remotely store and download licensed content for time shifted viewing, in a manner which rigorously protects legal rights of the content owners while overcoming the potential physical obstacles of limited bandwidth, power failures, incomplete uploads or downloads of content, limited cloud storage capacity, etc.

Such system implementation combines the benefits of a recommendation system which provides recommended content to a viewer DVR/STB 1204 with the flexibility of a collaborative STB system 1202 and further utilizes different download transmission techniques to efficiently use the local storage associated with a viewer system 32 and its corresponding local memory. Each of the recommendation systems and collaborative STB systems 1202 have a configuration and functionality as described elsewhere herein as well as in the previously referenced U.S. patents and U.S. patent applications incorporated herein. More specifically, collaborative STB system 1202 may be utilized to upload in a collaborative manner, as previously described, content either previously or subsequently determined by recommendation system as relevant to a particular viewer's profile. Channels of recommended content associated with a particular viewer profile may be downloaded to local memory associated with an individual viewer's DVR/STB system 1204 utilizing different transmission techniques and memory storage devices.

In one embodiment, the limited capacity of local memory associated with a viewer's DVR/STB system 1204 may be optimally used by first storing content recommended by the recommendation system, i.e. "favorites" which have an increased possibility of selection by the viewer given the viewer's profile and current content selections within the channel associated with the viewer's profile. The balance of local memory may be utilized to store lower ranked content objects within a viewer channel, that is, content which has a less likely possibility of being selected for viewing in accordance with its current ranking within the channel associated with the viewer's profile.

In addition to prioritizing and partitioning the manner in which recommended content or favorites are stored in local memory associated with the viewer's DVR/STB system 1204, different downloaded transmission techniques may be further utilized to ensure that the content objects most likely to be selected will be available given the somewhat dynamic and unpredictable nature of the bandwidth associated with either the public or private network infrastructure utilized to operatively couple a cloud storage system and a viewer system.

More specifically, high priority recommended content, that is, content most likely to be viewed or specifically requested, may be transmitted from the cloud DVR component 1209 to the viewer's DVR/STB system 1204 utilizing a unicast downloaded transmission, as previously described herein. In such a manner, a downloaded copy to which the viewer has rights, typically a collaboratively created copy of the content, is transmitted to a single viewer's DVR/STB system 1204 within the collaborative DVR community. Once stored in local memory, the content is viewable in a time-shifted manner, again as a local unicast transmission, from viewer's local memory to the viewer's presentation apparatus 1205.

At the same time, or asynchronously, lower priority content within a channel associated with a viewer profile may be transmitted from the cloud DVR system 1209 to one or more local DVR/STBs 1204A-N of viewer systems 32A-N in a multicast manner, that is, from a source to multiple recipients, particularly at times where greater volumes of low speed bandwidth are available, such as at night or off-peak hours relative to the local viewer's system. With a multicast download transmission, each of the recipient viewer systems 32A-N of the multicast is authorized to receive such content for storing and viewing in a time shifted manner similar to a "favorite". Again, once lower priority content is stored locally within the viewer system, upon selection thereof, it is streamed from the viewer system local memory to the presentation device, similar to the local unicast viewing of a favorite content object. Such lower priority content may include things such as daily news broadcasts, talk shows, or regularly scheduled programs which have a degree of popularity amongst the viewers within the collaborative DVR community, whereas a higher priority favorite content object may comprise a specific movie, TV show or real-time stream such as a sporting event.

Data and commands describing a viewer's selection and viewing behavior maybe transmitted back to the recommendation/modeling system 35, utilizing lower speed bandwidth on the network so that the viewer profile may be updated periodically. Similarly, commands from the recommendation system, to a local viewer system may be sent along lower speed bandwidth components of the network to ensure that previously downloaded but not viewed content is deleted from local memory.

Note that utilizing the collaborative STB system 1202 described herein, as well as the storage techniques and unicast/multicast transmissions, ensures that content is only available to recipients who are authorized to view the same in a time shifted matter, or as possibly acquired on a pay-per-view basis. Accordingly, the disclosed system maximizes memory usage and bandwidth to provide the best selection of recommended content to a viewer while complying with the protected legal rights of the content owner(s).

Method and System for Collaborative Cast of Content

Unicast transmissions load the Internet other network infrastructure from the central cloud storage until the end delivery at the viewer system, and, therefore, may require network fees to be paid to enter or exit a certain national network infrastructure or otherwise local network, due to the use of available network bandwidth. Accordingly, such unicast technique becomes commercially expensive once network resources are exceeded and additional resources are allocated. Multicast distribution of content has been used as a means of more efficiently using network bandwidth, however, multicast transmissions are often blocked or hampered in public internet networks, making public internet less suitable and thus requiring private networks for multicasting.

According to another aspect of the disclosure, a collaborative cast distribution technique, that is from one or more sources to one or more recipients, overcomes some of the problems associated with both current unicast and multicast transmissions. In the disclosed technique, a unicast transmission requested by one user (U1) is locally stored in the viewer system 32 hardware (HW1) and is also made available within the collaborative community by virtue of the cross licensed collaborative local STB/DVR hardware with integrated memory (still HW1, but cross licensed to User 2, U2) through a person-to-person (P2P) local stream in order to store favorites of the local user (U2) onto the local memory of the second viewer system 32 hardware (HW2), owned by U2.

This process may be achieved in the following manner. User 1 (U1) requests a resource intensive unicast from the cloud STB1206 to watch program A, using his local viewer system hardware (HW1) STB/DVR system 1204A. HW1 receives the content from the source, e.g. the cloud system, and streams the content in a unicast to U1's display device 1205, while making a local copy of the content object for future viewing and collaborative casting or sharing. HW1 sends a message to the STB/DVR 1204B-N one or more viewing systems 32B-N within the collaborative local community hardware boxes that content program A, or a portion thereof, is available for collaborative casting. Only the local hardware of users that qualify by having the viewing, and thus time-shifting rights, as approved from the rights verification/ checking engine in system 1135, can request a peer to peer stream (P2P cast) from HW1. The STB/DVRs 1204 (HW2-HWn) of other viewing systems 32B-N may request P2P casts for the content program in the order of likelihood of viewing in accordance with the channel/viewer profile of the viewer associated with that particular user (U2), e.g., first favorites and then other frequently watched shows based on viewing history and recommendations from the neuropsychological recommendation engine of recommendation/modeling system 35. When HW1 is confronted with multiple legitimate requests, HW1 may optimize the P2P cast for minimal local network load, given its own boundary conditions of available upload bandwidth and processor time. The receiving hardware the STB/DVR 1204B-N (HW2-HWn) of systems 32B-N will store the P2P cast of the content object locally and similarly forward the message of availability to their respective local collaborative communities, to the extent not already done so by HW1. Utilizing this protocol, a legitimate copy of a content program available for time-shifted viewing is spread to local memories of the STB/DVR 1204B-N of viewer systems 32B-N within the collaborative community, if the program is a favorite in that community and the viewers have the legal right and have given a record instruction to record that program. By continuously loading the local network serving the collaborative community, and avoiding peak loading of the public network, the disclosed technique minimizes peak loading of public and global network infrastructures and minimizes costs incurred associated with unicast of content over expensive private networks.

Collaborative Unicast and Multicast Using 4G LTE Technology

Network infrastructure typically does not provide viewing rights to the content transported thereby. Instead the viewing rights maybe authenticated through Digital Rights Management (DRM) authentication software associated with the content source or recommendation system, as applicable. A multicast of content is therefore legally distinguishable from a broadcast, since in a broadcast the broadcaster has the legal right to transmit content to a viewing public, while in a multicast system, the viewer utilizes the network infrastructure to transfer his or her own time-shifted copy of the content, to which they already possess viewing rights, from the cloud or from his/her viewing system hardware at the premises, to fellow collaborative community members, such hardware still being under his/her own control through his remote control, or website or otherwise.

Using multicast technology for transferring the user's time-shifted copy from a collaborative memory, located in the cloud system 1206 or distributed throughout the collaborative community viewer systems 32A-N, to the local streaming box (a STB/DVR client at the viewer's site for immediate TV viewing or storage in the cloud or in the local memory of a collaborative community viewers system), has the advantage of being much more efficient and at lower cost. However, the problem with a dedicated streaming network resource is that a third-party typically owns the streaming resource as part of a larger network infrastructure, e.g. a fixed line or cable multicasting.

In addition to the peer to peer cast as described previously, a multicast transmission may be performed using 3G and 4G LTE mobile phone technology or fixed line phone technology, 4G LTE is the standard for wireless communication of high-speed data for mobile phones and data terminals. Any of the previously described network infrastructure may be used in conjunction with additional a mobile network infrastructure, which is symbolized in FIGS. 11-12 by the wireless tower icon 1212 for brevity. With such phone technology, the STB/DVR systems 1204A-N can call each other to organize a peer-to-peer collaborative cast whereby multiple STB/DVR 1204 boxes, whether in the cloud or at specific premises, can be given the command to act as a server and initiate a conference call or to participate in a scheduled multicast stream via whichever STB/DVR systems 1204 is instructed by the user/ viewer, to conference into the scheduled multicast.

Depending on the task priority of the STB/DVR 1204, in which streaming to satisfy the viewer's current profile has top priority, the STB/DVR 1204 can selectively access a dedicated content stream when available and efficient. Missing packets of content can still be retrieved using specific request commands to any number of content sources. Software resident on the STB/DVR system 1204 organizes the content streaming, primarily to further minimize specific content requests overall and to minimize network load (e.g. Mbit per second) and total data transmitted (e.g. Giga bytes per subscription per month) at the client side, and, secondarily for optimization at the cloud server side 1206. Phone technology in 3G or 4G LTE or even fixed line, allows the use of a mixed model of scheduled dedicated streaming and specific content requests, optimizing for load and cost.

Collaborative Recording and Compression Protocol

According to another aspect of the disclosure, a compression technique may be implemented with Collaborative Video Recorder (CVR) or a cloud DVR, such as described herein with reference to FIGS. 1-12 and as further described in U.S. Pat. No. 8,433,815, issued Apr. 30, 2013 and entitled METHOD AND APPARATUS FOR COLLABORATIVE UPLOAD OF CONTENT by Bart P. E. van Coppenolle, et al., and U.S. application Ser. No. 14/041,162, filed Sep. 30, 2013, by Bart P. E. van Coppenolle, et al., published as U.S. Publication No. US-2014-0082125-A1 on Mar. 20, 2014, and entitled METHOD AND SYSTEM HAVING COLLABORATIVE NETWORK MEDIA APPLIANCES UTILZING PRIORITZED LOCAL STORAGE OF RECOMMENDED CONTENT, subject matters of which are incorporated herein by this reference for all purposes, the various components of which sometimes also referred to herein as the bhaalu CVR, the bhaalu software, bhaalu website.

The disclosed compression technique not only compresses video over time using information from other frames, as in the MPEG2 and H264 video compression/decompression (codec) protocols, but also compresses over the different viewers. Such viewers have been authenticated as entitled to receive the broadcast content and have expressed their will, or have produced volition, to make their personal copy for time-shifting purposes, and, therefore, are rightfully entitled to record these same programs. This solution drastically reduces the amount of storage capacity required to such order of magnitude suited for use in cloud DVRs.

FIG. 13 illustrates conceptually a schematic diagram 1300 of two users each operating the bhaalu cloud DVR independently to simultaneously but individually receive and compress, using shared hardware, and copy, using separated storage memory hardware, a program or content object, and, subsequently, then privately perform or view the content for themselves or to their own family circle.

As used in this disclosure and FIG. 13, the following abbreviations have the following meaning:

Dist. A 1322, Dist. B 1324: Retransmission or distribution to viewer 1 and viewer 2, by Pay TV Operator A and B of identical broadcast channel content, received and tuned by the individual users 1 and 2, using shared hardware in the cloud, based on individual title to attend the public performance and individual software license to access and control the shared hardware in the data center.

FTA 1320: Free To Air broadcast, reception or tuning of the same identical broadcast channel content, disabling the use by people to whom the broadcast content has not yet been distributed by a licensed distributor.

ID 1302A-B: Consumer and family Identity data as authenticated in the software (without valid authentication no hardware access is granted)

V 1304A-B: Volition parameter indicia manifesting individual volition to record as a function of time t and broadcast channel C. Further volition to move the own personal copy from one place to another place and to privately perform the own personal copy may also be registered.

R 1306A-B: Authenticated and verified right to content as a verified title (e-invoice, or log in credentials, or operator API) to attend the public performance of the broadcast channel content, as a function of broadcast channel and time.

SK1308A-B: Security Key data, time dependent

PC1322A-B: Personal Copy, stored in separated memory space, either long term (LT) or short term (ST), either belonging to user 1 (U1) 1315A or user 2 (U2) 1315B. In the case depicted in FIG. 13, user 2 has not produced volition to record time segment t−1 of Channel C, hence no personal PC U2 exists and also no access to decompression Codebook (CB) 1330 for time segment t−1 exists, which is represented by the spaces in the personal copy and associated codebook.

EC or STEC: Edge Cache or Short Term Edge Cache memory to accelerate access to the personal copy by moving the personal copy and its associated code book segments closer to the user. Edge cache may be located at both edges of the cloud.

A viewer who has a valid content, e.g. TV, subscription makes a copy for time-shifted personal viewing, by first expressing his volition using the bhaalu software, website and hardware, e.g. by pushing the buttons on the remote control. After the user has expressed his volition to record, the software checks if the user has the valid right to view the broadcast content and therefore also to record the broadcast content for time-shifting purposes. Different authentication technologies can be used to check that right e.g. e-invoicing or an API call to the operator based on the consumer identification (or customer number) or an operator authentication website portal.

The cloud DVR checks the identity of the user, the right of the user and the volition of the user and stores these checks as constituent key parts of the highly encrypted personal copy, when the user makes a copy using the cloud DVR.

The personal copy per viewer/user comprises the recorded program 1332 in a highly encrypted form, a codebook 1330, and an array of keys 1305. A unique position in this array consists of a combination of the three personal key elements complemented with a time vector (such as the init vector specified in HLS) and an encryption code. The fourth key part of the personal copy is the encryption key, (such as an AES encryption key) which is unique per TV channel per time unit (typically a day). The fifth key element contained by the personal copy is the time vector determining the video segment within the day. By incorporating time in the personal copy, user volition to record cannot apply on the period prior to the expression by the unique user of his personal volition to record a video segment of broadcast content uniquely identified in time.

In summary, the key array 1305 may comprise a plurality of data items, each element being a mathematical combination of the five key elements: identity 1302, right 1306, volition 1304, channel encryption and time. These five constituent elements together determine uniquely the broadcast content, the recording person and his/her right and volition at broadcast time, and allow after decryption the legal, time shifted consumption of the broadcast content, therefore materially constituting the user's personal copy in a highly compressed format. In addition, the personal copy comprises the encrypted copy of the content and a codebook.

In order to decode this highly compressed, encrypted personal copy stored in separated memory space per user, the codebook 1330 is used as the final decoding code array. The codebook 1330 may comprise a compressed and encrypted H264 video format, which does itself not uniquely describes the recording and is therefore not a copy of the broadcast content but is a decoding codebook. Only this codebook is stored in shared memory space of the collaborative video recorder.

When a viewer, after having recorded his/her personal copy, through his separate volition to playback, gives the instruction to playback his personal video recording using his/her remote control, smartphone, tablet or PC, his/her personal copy is decrypted using its key set and the codebook. Subsequently, his/her personal copy is streamed to his viewing device through unicast, guaranteeing private performance of his personal copy, since the peer to peer connection is made between the user separately storing his/her personal copy in separated private personal memory space and the same user himself/herself, without any direct interference from any other party. The unicast is thus streamed as a private performance from his/her personal copy in the cloud.

The codebook resulting from the compression is calculated by every user, using shared software, individually licensed to the individual copy making user. This collaborative codebook may be short term stored or buffered in shared memory space, as it represents the redundant or shared information over all personal copies. The shared information is not transferred from one user to another, but individually created and owned by each individual user.

The personal copy of content is uniquely and personally identifiable, as it is after compression at all times stored in separated memory space per person, when created, when moved or up or downloaded or streamed. The personal codebook associated with the personal copy and necessary to decompress the compressed personal copy consist of personal codebook time segments, depending on volition, right and identity. The different personal codebooks made by the different collaboratively compressing and copying users (depending on their personal volition) are stored in shared memory space in an overlapping way. The individual personal codebook remains, however, uniquely identifiable as separate from other personal codebooks, since the compressed personal copy earmarks the overlapping personal codebook segments as uniquely identifiable and distinguishable, hence separate. e.g. when user 2 in FIG. 13 does not make a personal copy of the broadcast on channel C for time segment t−1, he does not make a personal codebook CB portion either. This is represented by the empty (shared hardware) and (separated hardware) spaces in the personal copy 1332B and personal codebook 1330 in FIG. 13. If user 2 does not make his personal compressed copy in separate short term storage memory space and therefore does not make simultaneously his personal codebook either, storing it in shared memory space which is associated, linked or earmarked with his personal compressed copy, he subsequently cannot move his personal copy, comprising his or her personal compressed copy and his or her associated codebook, into short term edge cache or long term local memory, neither can he decompress using someone else's personal codebook nor stream from someone else's personal copy. A user who did not make his personal codebook cannot access any other personal codebook.

No transfer of ownership of a copy of the content object takes place since the identity of the person is part of the compressed personal copy earmarking the personal codebook stored in shared memory space. Only the own personal copy of a user can subsequently be accessed through the software. Therefore, are no distribution or transmission between any two parties takes place in the reception, compression, copy and play back process.

When playing back a personal copy, the transmission of the copy by unicast stream or up or download protocol, from the data center 1197 to the rest of the cloud may be accelerated by using front edge cache memory at the incoming edge of the cloud infrastructure. The same unicast may be accelerated at the outgoing edge of the cloud using outgoing front edge cache memory mirrored from the incoming front edge cache and stored in the content delivery network of the content source operator, supporting a business to business model with those operators. The compressed personal copy and the corresponding earmarked codebook is buffered in cache memory, separately for the personal compressed copy and overlapping for those overlapping time segments of personal codebooks. Caching enables accelerating the unicast steam of the personal copy to the personal device. If no personal copy is present in separate memory space, no stream can technically start from it. Volition to play back initiates the stream and its caching. Also when the user has pushed on his remote control the green button (to favorite a recording) or yellow button (to socially recommending a certain broadcast on social media) or his friends recommend the content over social media (while initial volition to record has been produced by the user), using the software, he pushes his personal copy and its associated codebook to the front edge cache prior to play back, for later accelerated play back. Once a personal copy has been pushed to separate cache memory it may be deleted from the initial separate memory space. The user indicates his volition, e.g., with the remote control that his personal recording should be pushed further and downloaded on local non-cloud long term memory storage space, if such memory is available and long term local storage policy business rules allow for it. All other separated memory spaces are temporary buffers, e.g. maximally 90 (plus the length of a series) days. The shared memory spaces storing the decompression codebooks are also temporary and are empty if no volition to record that particular time segment of that channel has been produced by any user at all.

From the foregoing explanation, the reader can appreciate that in accordance with the disclosed system and method, a cloud DVR user needs to authenticate, apply the rights verification procedure and produce volition to record before the cloud DVR software grants access to the cloud DVR hardware, creating causality between volition to record and the act of recording. Therefore it is the cloud DVR user who makes his own copy by operating the cloud DVR. This copy making falls within the copyright exception. Such process is entirely personal, even though shared hardware in the data center and cloud is used.

According to another embodiment, a cloud DVR service introduces a third party service provider who controls the copy making system and makes and streams the copies for the consumer against a service fee. A third party service provider can provide as a service, either the making available of hardware and software (in case the software is licensed under a software as a service or SaaS model) or internet services, or more problematically the third party can also provide a service of receiving & transmitting, copying and making available to other people the recorded broadcast content. In the latter case the service provider has active control over the reception, retransmission, copy making, making available or rebroadcasting activity.

If the disclosed system and method is alternatively implemented as a service model, the service provider may have a license to retransmit the broadcast and the technical nature of the personal copy may be implemented in order not to centrally store any part of the broadcast content in a master copy or a central copy that could be claimed to belong to a controlling person or entity. The service model implementation of the system software therefore stores the key frames of the broadcast content in the compressed personal copy, while replacing the non-key frames with low resolution frames, allowing for play back of the broadcast content in its entirety from the personal compressed copy, at lower quality, if done without using the corresponding codebook. The codebook still decompresses the personal compressed copy and thus increases the resolution of the non-key frames in the personal copy. The codebook itself does not contain the key frames and only contains the differential information to calculate the intermediate changes between the key frame and the non key frames. Since this information is mere relative information between the not included key frame and the other not included non-key frames, this differential codebook does not contain any frame, or any part, or any content time segment of the broadcast content itself. The mere differential codebook therefore does not constitute a centrally stored copy and cannot be argued to be a master copy belonging to a centrally controlling master.

It will be obvious to those reasonably skilled in the art that modifications to the systems and processes disclosed herein may occur, without departing from the true spirit and scope of the disclosure. For example, any two elements which communicate over a network or directly, may utilize either a push or a pull technique in addition to any specific communication protocol or technique described herein. Further, notwithstanding the network implementation described, any existing network or communications infrastructure technologies may be utilized, including any combination of public and private networks. In addition, although specific algorithmic flow diagrams or data structures may have been illustrated, these are for exemplary purposes only, other processes which achieve the same functions or utilized different data structures or formats are contemplated to be within the scope of the concepts described herein. As such, the exemplary embodiments described herein are for illustrative purposes and are not meant to be limiting.

What is claimed is:

1. A method comprising:
   A) providing a collaborative cloud storage system comprising:
      i) a cloud storage server comprising a network interface process for receiving into an associated network accessible memory data associated with a plurality of content objects, and
      ii) a plurality of viewer device processes operably coupled over a network to the cloud storage server and the network accessible memory, each of the plurality of viewer device processes having access to at least one channel of the plurality of content objects;

B) deriving a key array from user-defined indicia from one of the viewer device processes and storing the key array and an encrypted personal copy of content object in a private memory associated uniquely with the viewer device process for storing, C) generating a codebook to facilitate decrypting the encrypted personal copy of the content object of the viewer device process and storing in a shared memory space;

wherein the codebook comprises a compressed and encrypted H264 video format; and wherein the key array comprises a plurality of data items, each data item being a mathematical combination of the data elements representing values for identity, right, volition, channel encryption, and time.

2. The method of claim 1 further comprising:

D) upon receipt of indicia of volition from the viewer device process, utilizing the codebook to decrypt the personal copy of the content object.

3. The method of claim 2 further comprising:

E) unicast transmitting the encrypted personal copy of the content object to only the viewer device process.

4. A system comprising:

A) a cloud storage server comprising a network interface for receiving into an associated network accessible memory data associated with a plurality of the plurality of content objects;

B) a plurality of viewer device processes operably coupled over a network to the cloud storage server and the network accessible memory, each of the plurality of viewer device processes having access to at least one channel of content objects;

C) a private memory associated uniquely with each of the plurality of viewer device processes for storing a key array derived from user-defined indicia from the viewer device process and an encrypted personal copy of a content object, and D) a shared memory space for storing a codebook to facilitate decrypting the encrypted personal copy of the content object of one of the plurality of viewer device processes, wherein the codebook comprises a compressed and encrypted H264 video format; and wherein the key array comprises a plurality of data items, each data item being a mathematical combination of:
  indicia identifying the viewer device process,
  indicia of the volition of the viewer device process,
  indicia of the right of viewer device process,
  indicia identifying the channel of the content object, and
  indicia identifying a time of recording of the content object.

5. A memory device system for use with a data processing system comprising:

a first private memory portion associated uniquely with a viewer device process for storing a key array derived from user-defined indicia from the viewer device process and an encrypted personal copy of a content object, a second shared memory portion for storing a codebook to facilitate decrypting the encrypted personal copy of the content object in the first private memory portion wherein the first private memory portion and the second shared memory portion are inter-operably accessible over a network, wherein the codebook comprises a compressed and encrypted H264 video format; and wherein the key array comprises a plurality of data items, each data item being a mathematical combination of:
  indicia identifying the viewer device process,
  indicia of the volition of the viewer device process,
  indicia of the right of viewer device process,
  indicia identifying the channel of the content object, and
  indicia identifying a time of recording of the content object.

* * * * *